US012552928B2

(12) United States Patent
Louis et al.

(10) Patent No.: US 12,552,928 B2
(45) Date of Patent: *Feb. 17, 2026

(54) BLENDS OF POLY(ETHERKETONEKETONE) POLYMERS

(71) Applicant: Syensgo Specialty Polymers USA, LLC, Alpharetta, GA (US)

(72) Inventors: Chantal Louis, Alpharetta, GA (US); Mohammad Jamal El-Hibri, Atlanta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 430 days.

This patent is subject to a terminal disclaimer.

(21) Appl. No.: 18/001,436

(22) PCT Filed: Jun. 4, 2021

(86) PCT No.: PCT/EP2021/064960
§ 371 (c)(1),
(2) Date: Dec. 9, 2022

(87) PCT Pub. No.: WO2021/249874
PCT Pub. Date: Dec. 16, 2021

(65) Prior Publication Data
US 2024/0254332 A1    Aug. 1, 2024

Related U.S. Application Data

(60) Provisional application No. 63/038,100, filed on Jun. 11, 2020.

(30) Foreign Application Priority Data

Sep. 2, 2020  (EP) .................................. 20194026

(51) Int. Cl.
| | |
|---|---|
| C08L 71/00 | (2006.01) |
| C08J 5/24 | (2006.01) |
| C08K 3/28 | (2006.01) |
| C09J 5/00 | (2006.01) |
| C09J 11/04 | (2006.01) |
| C09J 171/00 | (2006.01) |

(52) U.S. Cl.
CPC ............ C08L 71/00 (2013.01); C08J 5/24 (2013.01); C08K 3/28 (2013.01); C09J 5/00 (2013.01); C09J 11/04 (2013.01); C09J 171/00 (2013.01); C08J 2371/10 (2013.01); C08J 2471/10 (2013.01); C08L 2205/025 (2013.01); C09J 2471/00 (2013.01)

(58) Field of Classification Search
None
See application file for complete search history.

(56) References Cited

U.S. PATENT DOCUMENTS

| | | | |
|---|---|---|---|
| 4,792,481 A | 12/1988 | O'Connor et al. | |
| 5,124,413 A | 6/1992 | Luise | |
| 5,250,738 A | 10/1993 | Hackenbruch et al. | |
| 5,300,693 A | 4/1994 | Gilb et al. | |
| 2011/0287255 A1 | 11/2011 | Bertelo | |
| 2015/0259530 A1 | 9/2015 | Rodgers et al. | |
| 2017/0225394 A9 | 8/2017 | Rodgers et al. | |
| 2019/0256707 A1* | 8/2019 | Bertelo | B32B 27/08 |
| 2020/0087455 A1 | 3/2020 | Louis | |
| 2020/0115499 A1 | 4/2020 | Louis | |
| 2021/0222009 A1 | 7/2021 | Paul et al. | |

FOREIGN PATENT DOCUMENTS

| | | |
|---|---|---|
| EP | 0102158 A2 | 3/1984 |
| EP | 0192260 A1 | 8/1986 |
| EP | 3012297 A1 | 4/2016 |
| IN | 193687 B | 7/2004 |
| WO | 2010088638 A1 | 8/2010 |
| WO | 2019150060 A1 | 8/2019 |
| WO | 2019243433 A1 | 12/2019 |

OTHER PUBLICATIONS

Handbook of Chemistry and Physics, 64th Edition, 1983-1984, p. B65-B158, CRC Press Inc, Boca Raton Florida (96 pages).
Standard ASTM D3418-03, "Standard Test Method for Transition Temperatures and Enthalpies of Fusion and Crystallization of Polymers by Differential Scanning Calorimetry", 2003, p. 1-7 (7 pages).
ASTM E1356-06, "Standard Test Method for Assignment of the Glass Transition Temperatures by Differential Scanning Calorimetry", 2003, p. 1-4 (4 pages).
Standard ASTM E793-06, "Standard Test Method for Enthalpies of Fusion and Crystallization by Differential Scanning Calorimetry", 2006, p. 1-4 (4 pages).
Standard ASTM E794-06, "Standard Test Method for Melting and Crystallization Temperatures by Thermal Analysis", 2006, p. 1-4 (4 pages).
Standard ASTM D6484-14, "Standard Test Method for Open-Hole Compressive Strength of Polymer Matrix Composite Laminates", 2014, p. 1-16 (16 pages).
Standard ASTM D3518-13, "Standard Test Method for In-Plane Shear Response of Polymer Matrix Composite Materials by Tensile Test of a ±45° Laminate", 2013, p. 1-7 (7 pages).

(Continued)

*Primary Examiner* — Robert T Butcher
(74) *Attorney, Agent, or Firm* — Osha Bergman Watanabe & Burton LLP

(57) ABSTRACT

The present invention relates to blends of poly(ether ketone ketone) (PEKK) polymers, in particular to certain blends endowed with lower melting point than traditional PEKK polymers, yet maintaining high crystallinity and rapid crystallization behaviour, which are composed of a major amount of a first nucleophilic PEKK having a first T/I ratio, and a minor amount of a second PEKK having a second T/I ratio higher than the first T/I ratio; to methods of making the same, and to uses thereof in various fields.

15 Claims, 1 Drawing Sheet

(56) References Cited

OTHER PUBLICATIONS

International Search Report issued in International Application No. PCT/EP2021/064962, dated Jul. 7, 2021 (4 pages).
Written Opinion issued in International Application No. PCT/EP2021/064962, dated Jul. 7, 2021 (7 pages).
International Search Report issued in International Application No. PCT/EP2021/064960 dated Jul. 7, 2021 (4 pages).
Written Opinion issued in International Application No. PCT/EP2021/064960 dated Jul. 7, 2021 (7 pages).
Veazey, Dustin Montgomery, Microstructural Control of Polyaryletherketones and their Fiber Reinforced Composites, United States, Pennsylvania State University, Dec. 2018; (74 pages).
Office Action issued in corresponding U.S. Appl. No. 18/009,678 mailed on Jul. 3, 2025 (31 pages).

\* cited by examiner

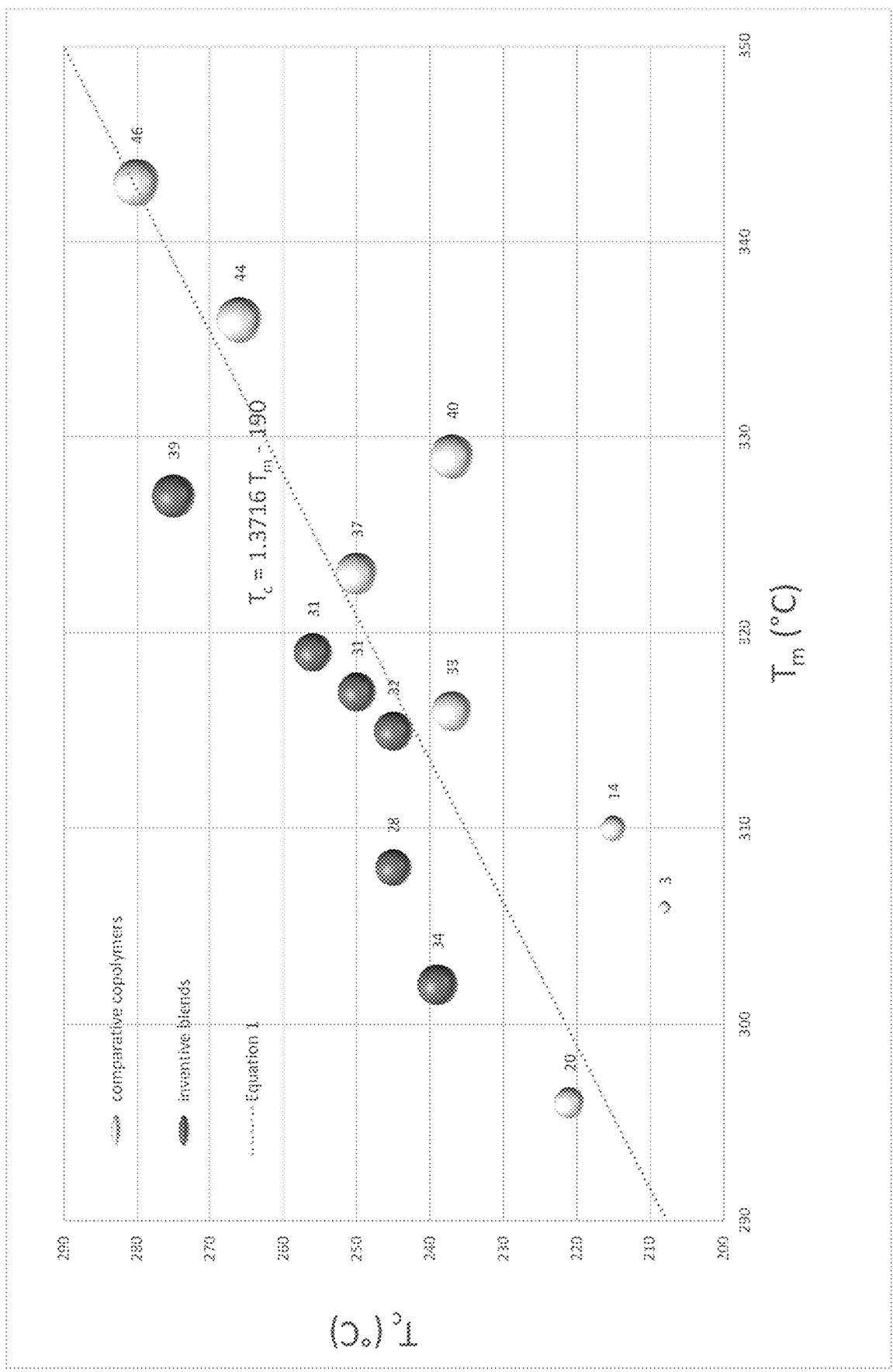

BLENDS OF POLY(ETHERKETONEKETONE) POLYMERS

This application is a national stage entry of PCT/EP2021/064960, which claims priorities of U.S. provisional application 63/038,100 filed on Jun. 11, 2020, and of EP patent application 20194026.9 filed on Sep. 2, 2020, the whole content of each of these applications being incorporated herein by reference for all purposes.

TECHNICAL FIELD

The present invention relates to blends of poly(ether ketone ketone) (PEKK) polymers, in particular to certain blends endowed with lower melting point than traditional PEKK polymers, yet maintaining high crystallinity and rapid crystallization behaviour, and to methods of making the same, and to uses thereof in various fields.

BACKGROUND ART

Poly(ether ketone ketone) ("PEKK") polymers are well established materials which have found use in relatively extreme conditions. Notably, due to the high crystallinity and high melt temperature of PEKK polymers, they have excellent thermal, physical and mechanical properties. Such properties make PEKK polymers desirable in a wide range of demanding application settings including, but not limited to, aerospace and oil and gas drilling, but also as thermoplastic matrices for composite structures.

Notably, PEKK with a nominal T/I molar ratio of about 70/30 is a well-established and proven matrix resin for thermoplastic continuous fiber composites, which can be sourced from several suppliers and produced either through electrophilic processes, essentially involving Friedel-Crafts assisted Al-containing Lewis Acid catalyzed electrophilic substitution of mixtures of iso/terephthalic acid chloride on a phenoxy-terminated aromatic monomer, or through nucleophilic route, essentially involving polycondensation of di-hydroxy and di-fluoro benzoyl-containing aromatic compounds and/or of hydroxyl-fluoro benzoyl-containing aromatic compounds. Although with obvious differences due to the inevitable fingerprints of the synthetic routes on their respective microstructures, both "electrophilic" PEKK ("ePEKK") and "nucleophilic" PEKK ("nPEKK") afford an excellent combination of strength, stiffness, thermal resistance and chemical resistance to composite laminate panels and other consolidated articles based on its pre-impregnated sheets and tapes (prepreg).

Nevertheless, the same high crystallinity and high melt temperatures that provide many of the benefits of PEKK polymers also present difficulties in processing. Hence, there is a need in the industry that fabricates and uses such PEKK polymers, in particular in composite structures, to be provided with a lower melting temperature ($T_m$) PEKK alternative that would allow easier and more forgiving fabrication, energy savings, and faster production cycle times. Indeed, the $T_m$ of PEKK with nominal T/I of about 70/30 is approximately 340° C. Considering that semicrystalline thermoplastics require melt processing temperatures that are at least about 40° C. above the melting temperature, plastic temperature has to reach at least 380° C. in order to adequately fabricate composites based on this PEKK. There is hence a need to drop the $T_m$ of the PEKK polymers for reducing melt fabrication temperatures, and to possibly allow melt processing at temperatures of 360° C. or even lower. One of the constraints imposed by such long felt industrial requirement is thus to provide for a PEKK material having a $T_m$ of at most 330° C., yet without detrimentally affecting all other advantageous properties of the PEKK, while additionally delivering a fast rate of crystallization (as manifested by the crystallization temperature, $T_c$) such that (i) crystallization occurs at a temperature closer to $T_m$, than what is observed in state of the art compositions for a given T/I ratio of PEKK polymer and that (ii) substantially no further "cold" crystallization occurs on subsequent heating, once material is cooled from the melt at a rate of 20° C./min, as a sign that in rapid cycles melt fabrication, material "as molded" has already developed all its inherent crystallization upon cooling, and will not undergo any further crystallization phenomena in its subsequent exposure to heat (e.g. during its use) which may cause internal tensions, distortions or other unwanted phenomena. Additionally, and perhaps more importantly, full crystallization is needed during the conventional fabrication cooling cycle to assure that the composite is able to exhibit chemical and environmental resistance to its full potential during part service.

Approaches based on blending for modifying properties of polyaryletherketone polymers have been pursued in the prior art.

Within this scenario, US 2015/0259530 describes blends intended for reducing thereby defined "cold crystallization temperature": aim of the blends so provided is hence to reduce the temperature wherein crystallization occurs upon heating, before the actual melting phase transition, as the availability of a large temperature window between crystallization and melting is retained therein as a key processing parameter for 3D printing. This document suggests formulating PEKK copolymers of differing T/I ratios and viscosities to achieve balances between toughness, crystallinity and thermal capabilities, and hence provided the intended 3D printing processability. It exemplifies a blend of two electrophilic PEKKs, commercially available under trade name KEPSTAN®, significantly differing for their T/I content (T % content difference of 20 mol. %). Consistently with the intended aim of the thereby provided solution, such blends, whereas the individual e-PEKK used significantly differ in T/I ratios and are such to somewhat hinder the co-crystallization behaviour, are shown to possess "cold crystallization" behaviour. Indeed, the thereby exemplified blends, once cooled from melting at 10° C./min, are shown to possess a non-null crystallization exotherm upon further heating (thereby referred to as "cold crystallization"), so showing that, despite the very slow cooling rate, the blends have yet ability to further crystallize, as a sign that their crystallization rate is somewhat hindered.

Consequently, while such blends may find utility in additive manufacturing fields of use, whereas materials are intended to remain in heated building chambers for very long processing times, the such blends do not fulfil the requirements above listed for being effectively used as matrices for thermoplastic composites, in particular for composite parts fabricated by fast cycles.

SUMMARY OF INVENTION

This invention provides for PEKK compositions that combine low melting points with remarkably increased rates of crystallization and levels of crystallinity that are higher than expected for a given total tere/iso (T/I) ratio in the PEKK composition. The compositions are obtained by blending a first PEKK made by a nucleophilic process with a suitable amount of a second PEKK, as detailed below, and, optionally, an inorganic nucleating agent, to arrive at a PEKK composition advantageously exhibiting a $T_m$ of ≤330 C while exhibiting a rate of crystallization that is higher than expected for the T/I content of the PEKK composition. These compositions also exhibit a practical level of crystallinity as evidenced by a heat of fusion of 25 J/g or greater. The compositions combine fast fabrication cycle times for composites fabrication with the improved economics that accompany lower energy consumption. The high level of crystallinity in these compositions assures robust chemical resistance in the composite structures utilizing them. These compositions, the methods to achieve their attributes, and their end uses in thermoplastic composites applications are subject matter of the present application.

The present invention provides a composition [composition (C)] comprising:

a major amount of a first PEKK polymer [polymer (PEKK$_{low}$)] comprising recurring units ($R^T$) and recurring units ($R^I$), having a first molar content of units ($R^T$) [($T_{low}$)] and a first molar content of units ($R^I$) [($I_{low}$)], with $$T_{low}(\text{mol. \%}) = \frac{[\text{units } (R^T)]_{low}}{[\text{units } (R^T)]_{low} + [\text{units } (R^I)]_{low}} \times 100$$

and with $$I_{low}(\text{mol. \%}) = \frac{[\text{units } (R^I)]_{low}}{[\text{units } (R^T)]_{low} + [\text{units } (R^I)]_{low}} \times 100,$$

so defining a first T/I ratio [(T/I)$_{low}$], with $$(T/I)_{low} = \frac{T_{low}}{I_{low}};$$

wherein recurring unit ($R^T$) is represented by formula (T):

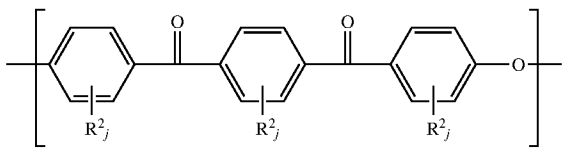

and recurring unit ($R^I$) is represented by formula (I):

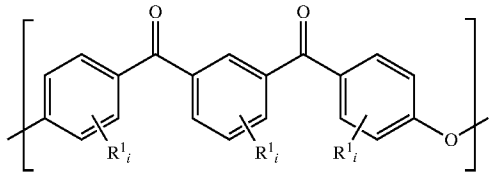

wherein:
each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, is an independently selected integers ranging from 0 to 4; and a minor amount of a second PEKK polymer [polymer (PEKK$_{high}$)] comprising said recurring units ($R^I$) and said recurring units ($R^T$), having a second molar content of units ($R^T$) [($T_{high}$)] and a second molar content of units ($R^I$) [($I_{high}$)], with $$T_{high}(\text{mol. \%}) = \frac{[\text{units } (R^T)]_{high}}{[\text{units } (R^T)]_{high} + [\text{units } (R^I)]_{high}} \times 100$$

and with $$I_{high}(\text{mol. \%}) = \frac{[\text{units } (R^I)]_{high}}{[\text{units } (R^T)]_{high} + [\text{units } (R^I)]_{high}} \times 100,$$

so defining a second T/I ratio [(T/I)$_{high}$], with $$(T/I)_{high} = \frac{T_{high}}{I_{high}};$$

wherein polymer (PEKK$_{low}$) is a nucleophilic PEKK; and
wherein the (T/I)$_{low}$ of PEKK$_{low}$ is lower than the (T/I)$_{high}$ of PEKK$_{high}$; and
wherein the following inequality is satisfied:

$$T_{high} - T_{low} \leq 17 \text{ mol. \%.}$$

The inventive composition advantageously possesses the following features:
a melting temperature ($T_m$) of less than or equal to 330° C.;
a heat of fusion ($\Delta H_f$) exceeding 25 J/g;
no crystallization peak upon heating, on second DSC heat scan ("cold crystallization peak"); and
a relation between melting temperature ($T_m$ in ° C.) determined on second DSC heat scan and crystallization temperature ($T_c$ in ° C.) determined on first DSC cooling scan, satisfying the following inequality:

$$T_c \geq 1.3716 \times T_m - 190° \text{ C.},$$

wherein $T_m$, $T_c$, $\Delta H_f$ and the absence of cold crystallization peak are measured by differential scanning calorimetry (DSC) according to ASTM D3418-03, E1356-03, E793-06, E794-06, standard, applying heating and cooling rates of 20° C./min, with a sweep from 30° C. to 400° C.

The invention further pertains to the use of the composition as detailed above in various field of use, including notably as thermoplastic matrix in composite structures.

BRIEF DESCRIPTION OF DRAWING

The FIGURE is a bubbles chart, wherein centers of bubbles provide for a plot of $T_c$ (in ° C.) as a function of $T_m$ (° C.) for both comparative PEKK copolymers (clear bubbles) and inventive blends (dark bubbles), whereas the size of the bubbles is representative of the $\Delta H_f$ (in J/g), further explicitly provided as label for said bubbles.

DETAILED DESCRIPTION OF THE INVENTION

As said, the inventive composition comprises polymer (PEKK$_{low}$) and polymer (PEKK$_{high}$), which are collectively referred to as polymers (PEKK). As said, polymers (PEKK) comprise recurring units (R$^T$) and recurring units (R$^I$), represented by formula (T) and (I), respectively, as detailed above.

According to an embodiment, R$^1$ and R$^2$ are, at each location in formulas (T) and (I) above, independently selected from the group consisting of a C$_1$-C$_{12}$ moiety optionally comprising one or more than one heteroatoms; sulfonic acid and sulfonate groups; phosphonic acid and phosphonate groups; amine and quaternary ammonium groups.

According to another embodiment, i and j are zero for each R$^1$ and R$^2$ group. In other words, recurring units (R$^T$) and (R$^I$) are both unsubstituted. According to this embodiment, recurring units (R$^T$) and (R$^I$) are respectively represented by formulas (T') and (I'):

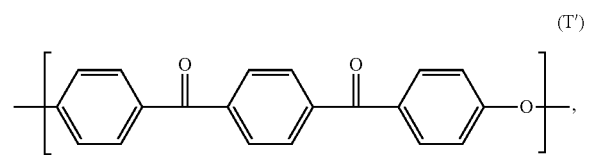

(T')

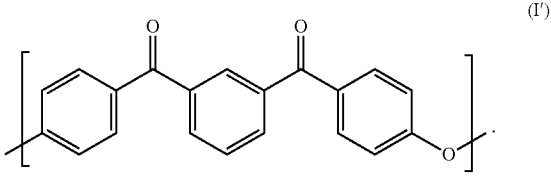

(I')

According to another embodiment, the polymers (PEKK) comprise recurring units (R$^T$) and recurring units (R$^I$), as detailed above, in a combined amount of at least 50 mol. %, based on the total number of moles in the polymer (PEKK).

Polymer (PEKK) may comprise minor amounts of recurring units different from recurring units (R$^T$) and recurring units (R$^I$), as detailed above, and which may be selected from the group consisting of recurring units (R$_{PAEK}$) comprising a Ar—C(O)—Ar' group, with Ar and Ar', equal to or different from each other, being aromatic groups. The recurring units (R$_{PAEK}$) may be generally selected from the group consisting of formulae (J-A) to (J-O), herein below:

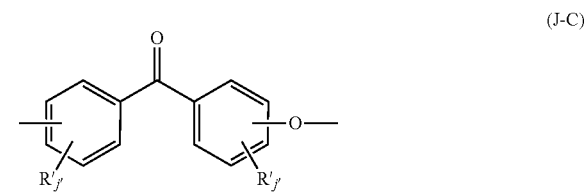

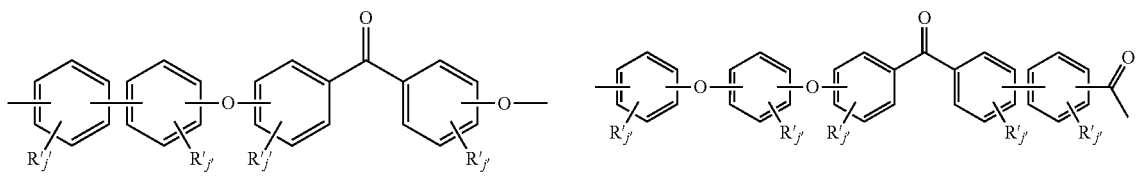

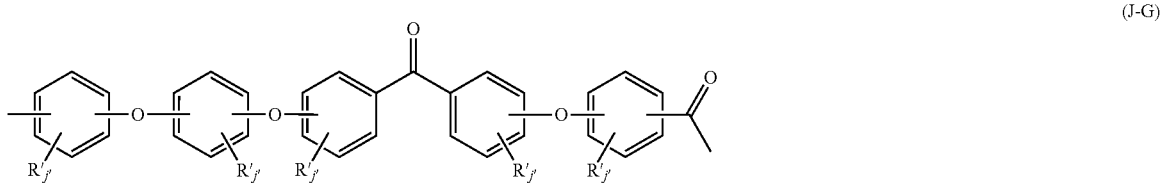

-continued

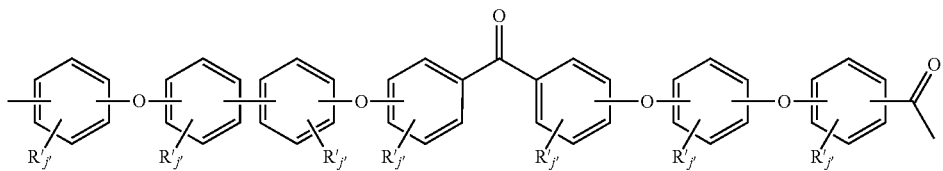
(J-H)

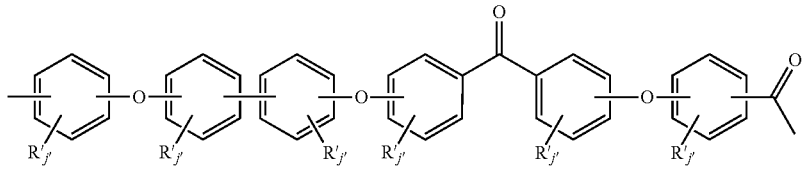
(J-I)

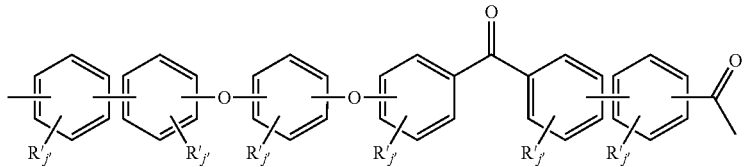
(J-J)

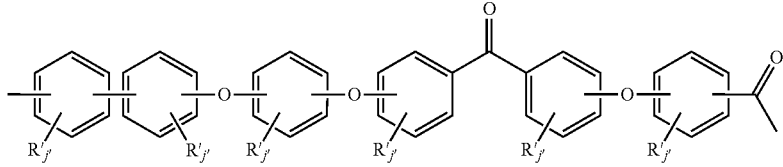
(J-K)

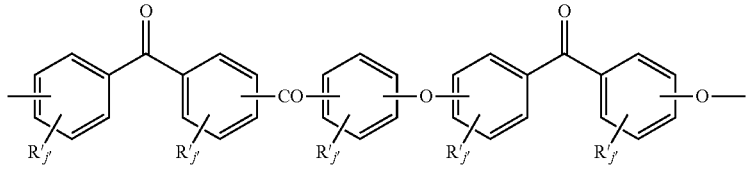
(J-L)

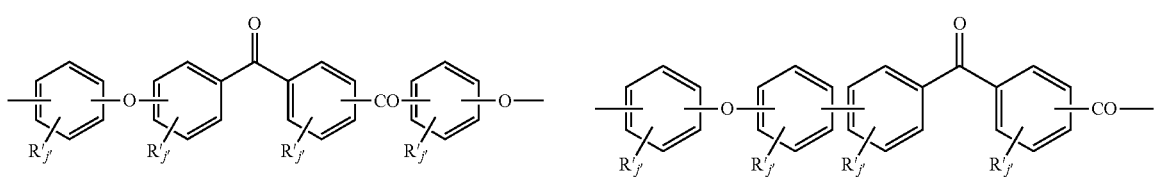
(J-M)  (J-N)

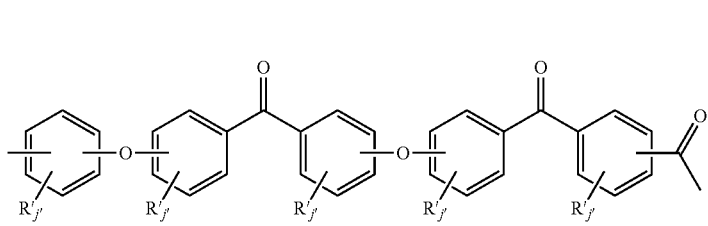
(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units (R$_{PAEK}$) are thus selected from those of formulae (J'-A) to (J'-O) herein below:
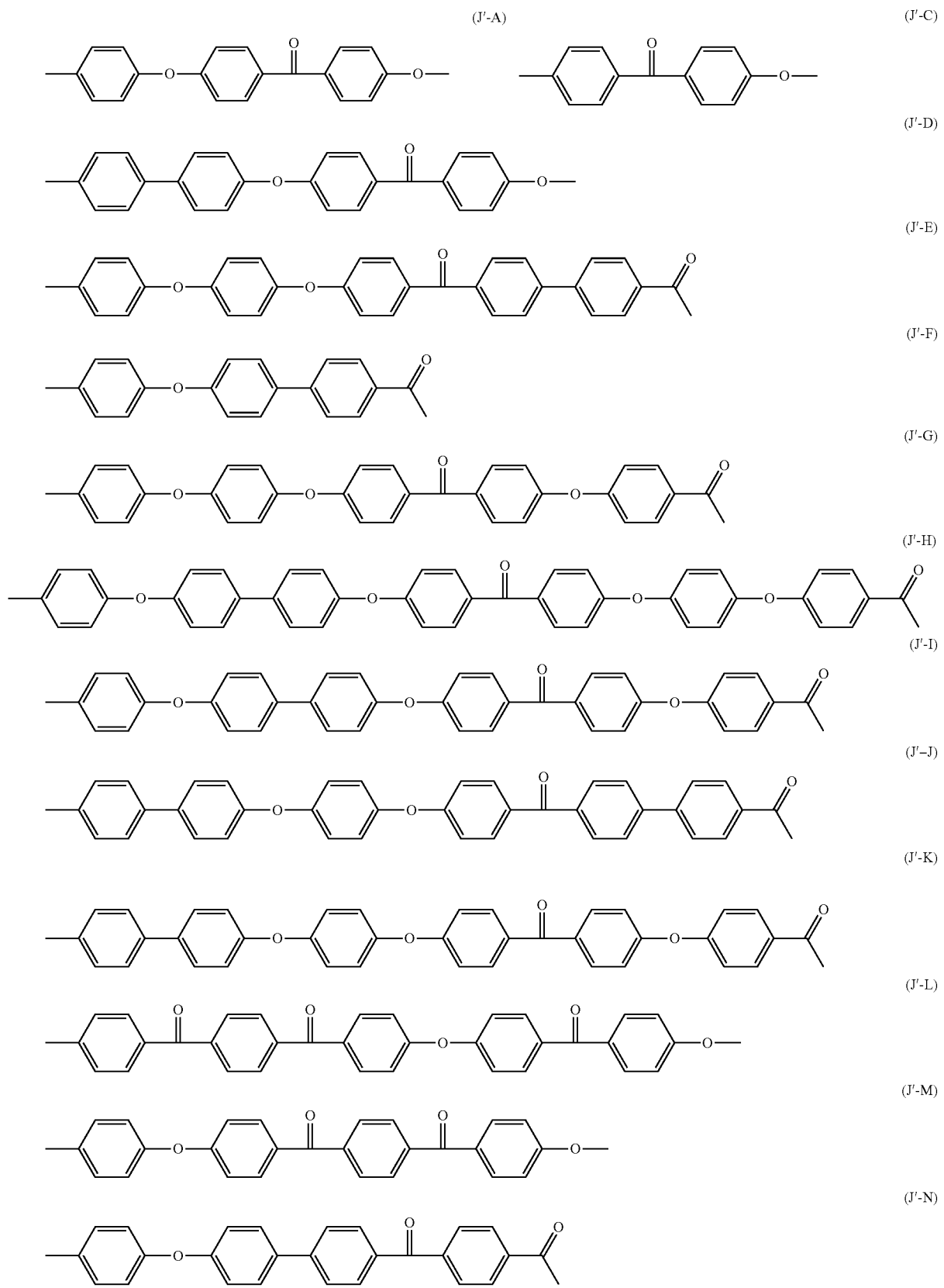

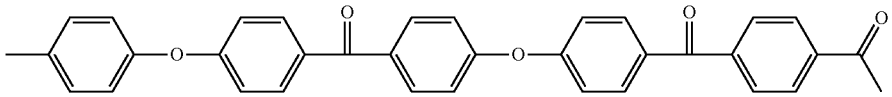

(J'-O)

-continued

While polymers (PEKK) comprising recurring units ($R_{PAEK}$) different from recurring units ($R^T$) and ($R^I$), as detailed above, may be used, it is generally understood that preferred polymers (PEKK) are those wherein the amount of said recurring units ($R_{PAEK}$) is limited, and is preferably of at most 40 mol. %, more preferably at most 30 mol. %, more preferably at most 20 mol. %, even more preferably at most 10 mol. %, even at most 5 mol. %, the mol. % being based on the total number of moles in the polymer (PEKK).

Hence, according to an embodiment, at least 60 mol. %, at least 70 mol. %, at least 80 mol. %, at least 90 mol. %, at least 95 mol. %, at least 99 mol. % or substantially all of the recurring units in the polymers (PEKK) are recurring units ($R^T$) and ($R^I$), as detailed above, the mol. % being based on the total number of moles in the polymer (PEKK). The expression "substantially all", when used in connection with constituting recurring units of polymers (PEKK) is intended to indicate that minor amounts of spurious/defective recurring units may be present, e.g. in an amount of less than 1 mol. %, preferably of less than 0.5 mol. %, more preferably of less than 0.1 mol. %. When no other recurring unit than recurring units ($R^T$) and ($R^I$) is detected in polymer (PEKK), this polymer will be qualified as a polymer (PEKK) wherein all units are units ($R^T$) and ($R^I$), which is a preferred embodiment of the present invention.

The polymer ($PEKK_{low}$) is a nucleophilic PEKK, which means that polymer ($PEKK_{low}$) is produced by polycondensation of di-hydroxy and di-fluoro benzoyl-containing aromatic compounds and/or of hydroxyl-fluoro benzoyl-containing aromatic compounds. Nucleophilic character of polymer ($PEKK_{low}$) is notably evidenced by the presence of fluorine, in amounts of generally exceeding 100 ppm, preferably exceeding 200 ppm, even more preferably exceeding 300 ppm. Such organically-bound fluorine is the inevitable fingerprint of the use of fluorine-containing monomers. Further evidence of the nucleophilic character of polymer ($PEKK_{low}$) is provided by the substantial absence of Al residues, that is to say that the Al content is generally below 50 ppm, preferably below 25 ppm, more preferably 10 ppm. Al and F content are conveniently determined by elemental analysis, such as ICP-OES analysis for Al and Combustion-ion chromatography for fluorine.

Because of its nucleophilic character, the polymer ($PEKK_{low}$) is also characterized by a low volatiles content. The amount of volatiles can be determined using thermogravimetry (TGA) according to ASTM D3850 method; the temperature $T_d$, at which a determined amount of volatile materials (e.g. 1 wt. % or 2 wt. %) leave the sample, is determined by heating progressively the sample from 30° C. to 800° C. under nitrogen using a heating rate of 10° C./min. The thermal decomposition temperature at 1 wt. % is referred to as $T_d(1\%)$. In an embodiment of the invention, the polymer ($PEKK_{low}$) has a $T_d(1\%)$ of at least 500° C., preferably at least 505° C., more preferably at least 510° C., as measured by thermal gravimetric analysis according to ASTM D3850, heating from 30° C. to 800° C. under nitrogen using a heating rate of 10° C./min.

The Applicant has surprisingly found that the advantageous effect of the present invention can solely be achieved when at least polymer ($PEKK_{low}$) is a nucleophilic PEKK, possessing notably the advantageous features (F content, Al content, $T_d(1\%)$) mentioned above, and preferably when both polymer ($PEKK_{low}$) and polymer ($PEKK_{high}$) are nucleophilic PEKK, with hence also polymer ($PEKK_{high}$) possessing the advantageous features (F content, Al content, $T_d(1\%)$) described above in connection with polymer ($PEKK_{low}$); without being bound by this theory, the Applicant is of the opinion that the peculiar microstructure of polymers (PEKK) achieved through nucleophilic synthetic route, including notably absence of "regioselectivity"-errors and/or branching phenomena, which, while rare, could nonetheless occur in electrophilic synthetic route, is such to enable achieving the peculiar advantageous thermal behavior achieved by the inventive blends.

As said, in the composition of the present invention, wherein the $(T/I)_{low}$ of $PEKK_{low}$ is lower than the $(T/I)_{high}$ of $PEKK_{high}$; the polymer ($PEKK_{low}$) preferably has a $(T/I)_{low}$ of at least 50/50, preferably of at least 54/46, more preferably of at least 56/44; most preferably of at least 57/43 and/or a $(T/I)_{low}$ of at most 64/36, preferably of at most 63/37, more preferably of at most 62/38. Polymers ($PEKK_{low}$) with a $(T/I)_{low}$ of comprised between 57/43 and 62/38 have been found particularly advantageous for use in the blends of the present invention.

As said, the polymer ($PEKK_{high}$) is also preferably a nucleophilic PEKK, which means that also polymer ($PEKK_{high}$) is produced by polycondensation of di-hydroxy and di-fluoro benzoyl-containing aromatic compounds and/or of hydroxyl-fluoro benzoyl-containing aromatic compounds, and hence possesses advantageously a fluorine content of generally exceeding 100 ppm, preferably exceeding 200 ppm, even more preferably exceeding 300 ppm, and/or an Al content of generally below 50 ppm, preferably below 25 ppm, more preferably 10 ppm.

The polymer ($PEKK_{high}$) preferably has a $(T/I)_{high}$ of at least 65/35, preferably of at least 66/34, more preferably of at least 67/33; and/or a $(T/I)_{high}$ of at most 75/25, preferably of at most 73/27, more preferably of at most 72/28. Polymers ($PEKK_{high}$) with a $(T/I)_{high}$ of comprised between 67/33 and 72/28 have been found particularly advantageous for use in the blends of the present invention.

Further, in the composition of the invention, the following inequality is satisfied: $T_{high}-T_{low} \leq 17$ mol. %. Hence, depending on the choice of a particular polymer ($PEKK_{low}$), possessing a certain $T_{low}$, the choice of the $T_{high}$ of suitable polymers ($PEKK_{high}$) is consequently restricted, and vice-versa. Without being bound by this theory, the Applicant is of the opinion that solely when the polymers PEKK differ in fraction of T units in a moderate manner, the underlying co-crystallization phenomena which are finally responsible for the advantageous thermal properties of the inventive blends can be achieved.

Further, polymer ($PEKK_{low}$) and polymer ($PEKK_{high}$) of the inventive composition are preferably such that $T_{high}-T_{low} \leq 16$ mol. %, more preferably such that $T_{high}-T_{low} \leq 15$ mol. %. It is further understood that polymer (PEKK$_{low}$) and polymer (PEKK$_{high}$) generally differ in their T content in a manner such that T$_{high}$−T$_{low}$≥3 mol. %, more preferably such that T$_{high}$−T$_{low}$≥4 mol. %, even more preferably T$_{high}$−T$_{low}$≥5 mol. %.

Blends with advantageous properties have been notably obtained with polymer (PEKK$_{low}$) and polymer (PEKK$_{high}$) such that T$_{high}$−T$_{low}$ is from about 10 to about 13 mol. %.

The composition comprises a major amount of polymer (PEKK$_{low}$) and a minor amount of polymer (PEKK$_{high}$). The expression "major amount" and "minor amount" have the meaning commonly understood, that is to say that the amount of polymer (PEKK$_{low}$) exceeds the amount of polymer (PEKK$_{high}$).

Generally, the weight ratio between polymer (PEKK$_{low}$) and polymer (PEKK$_{high}$) in the inventive composition is advantageously of at least 60/40, preferably of at least 65/35, more preferably at least 70/30, even more preferably at least 75/25 and/or it is of at most 99/1, preferably of at most 97/3, even more preferably at most 96/4.

As said, the inventive composition advantageously possess:
- a melting temperature (T$_m$) of less than or equal to 330° C.
- a heat of fusion (ΔH$_f$) exceeding 25 J/g;
- no crystallization peak upon heating, on second DSC heat scan ("cold crystallization peak"); and
- a relation between melting temperature (T$_m$ in ° C.) determined on second DSC heat scan and crystallization temperature (T$_c$ in ° C.) determined on first DSC cooling scan, satisfying the following inequality:

$$T_c \geq 1.3716 \times T_m - 190° C.,$$

wherein T$_m$, T$_c$, ΔH$_f$ and the absence of cold crystallization peak are measured by differential scanning calorimetry (DSC) according to ASTM D3418-03, E1356-03, E793-06, E794-06, standard, applying heating and cooling rates of 20° C./min, with a sweep from 300° C. to 400° C.

As far as the determination of presence/absence of the cold crystallization peak, it is understood that when no exothermic peak exceeding 0.5 J/g preceding melting onset temperature is detected by DSC on second heat scan, this is representative of the absence of cold crystallization peak. Generally, in the inventive composition, substantially no exothermic peak is detected by DSC on second heat scan, which means that no detectable release of energy within the sensitivity limit of the instrument is observed.

Depending upon the target field of use, the molecular weight of the inventive composition (C) may be adapted. In particular, notably when composition (C) is intended for use as thermoplastic matrix for composite structures, it is generally understood that molecular weight of composition (C) will be adapted so as to obtain a MFI, measured according to ASTM D1238, under a piston load of 8.4 kg, as defined in the examples, at a temperature of 340 to 360° C., in the range of 60 to 120 g/10 min.

Further, notably when composition (C) is intended for use as a tie layer (aka binder film) in multi-layer assemblies, molecular weight of composition (C) will be adapted so as to obtain a MFI, measured according to ASTM D1238, under a piston load of 8.4 kg, as defined in the examples, at a temperature of 340 to 360° C., in the range of 15 to 50 g/10 min.

According to certain embodiments, the composition of the invention further comprises of at least one nitride (NI) of an element having an electronegativity (ε) of from 1.3 to 2.5.

Electronegativity values (ε) are notably listed in «Handbook of Chemistry and Physics», CRC Press, 64$^{th}$ edition, pages B-65 to B-158.

Within the context of the present invention the expression "at least one nitride (NI)" is intended to denote one or more than one nitride (NI). Mixtures of nitrides (NI) can be advantageously used for the purposes of the invention.

Non limitative examples of nitrides (NI) of an element having an electronegativity (ε) of from 1.3 to 2.5 are listed notably in «Handbook of Chemistry and Physics», CRC Press, 64$^{th}$ edition, pages B-65 to B-158. The code into brackets is the one attributed by the CRC Handbook to the concerned nitride, while c denotes the electronegativity of the element from which the nitride is derived. Accordingly, nitrides (NI) of an element having an electronegativity (ε) of from 1.3 to 2.5 suitable to the purpose of the present invention are notably aluminum nitride (AlN, a45, ε=1.5), antimony nitride (SbN, a271, ε=1.9), beryllium nitride (Be$_3$N$_2$, b123, ε=1.5), boron nitride (BN, b203, ε=2.0), chromium nitride (CrN, c406, ε=1.6), copper nitride (Cu$_3$N, c615, ε=1.9), gallium nitride (GaN, g41, ε=1.6), trigermanium dinitride (Ge$_3$N$_2$, g82, ε=1.8), trigermanium tetranitride (Ge$_3$N$_4$, g83, ε=1.8), hafnium nitride (HfN, h7, ε=1.3), iron nitrides like Fe$_4$N (i151, ε=1.8) and Fe$_2$N or Fe$_4$N$_2$ (i152, ε=1.8), mercury nitride (Hg$_3$N$_2$, m221, ε=1.9), niobium nitride (n109, ε=1.6), silicium nitride (Si$_3$N$_4$, s109, ε=1.8), tantalum nitride (TaN, t7, ε=1.5), titanium nitride (Ti$_3$N$_4$, t249, ε=1.5), tungsten dinitride (WN$_2$, t278, ε=1.7), vanadium nitride (VN, v15, ε=1.6), zinc nitride (Zn$_3$N$_2$, z50, ε=1.6) and zirconium nitride (ZrN, z105, ε=1.4).

Preferred nitrides (NI) for use in the composition of the invention are nitrides of an element having an electronegativity of preferably at least 1.6, and more preferably at least 1.8 and/or of preferably at most 2.2.

Besides, the nitride (NI) is chosen preferably from nitrides of an element chosen from Groups IIIa, IVa, IVb, Va, Vb, VIa, VIb, VIIb and VIII of the Periodic Table of the Elements, and more preferably from nitrides of an element of Group IIIa of the Periodic Table of the Elements.

Particularly good results have been obtained when the nitride (NI) was boron nitride, which is the preferred nitride (NI).

Among the different crystalline forms of boron nitride, it is preferable to use hexagonal boron nitride in the composition according to this embodiment.

Generally, the average particle size of the nitride (NI) is advantageously equal to or below 30 μm, preferably equal to or below 20 μm, more preferably equal to or below 18 μm, more preferably equal to or below 10 μm, and/or is preferably equal to or at least 0.05 μm, equal to or at least 0.1 μm, more preferably equal to or at least 0.2 μm, equal to or at least 1 μm.

The average particle size of the nitride (NI) is preferably from 1 μm to 20 μm, more preferably from 2 μm to 18 μm, more preferably from 2 μm to 10 μm.

An average particle size of the nitride (NI) of about 2.5 m gave particularly good results. In particular, a boron nitride having such average particle size has been found particularly effective.

The average particle size of the nitride (NI) may be measured via light scattering techniques (dynamic or laser) using the respective equipment coming for example from the company Malvern (Mastersizer Micro or 3000) or using screen analysis according to DIN 53196.

According to these or other embodiments, the composition of the invention may comprise, beside polymer (PEKK$_{low}$) and polymer (PEKK$_{high}$), and possibly beside nitride (NI), one or more than one additional ingredients.

Such ingredients can be advantageously selected notably from the group consisting of colorants, pigments, light stabilizers, heat stabilizers, antioxidants, acid scavengers, processing aids, crystallization nucleating agents, internal lubricants and/or external lubricants, flame retardants, smoke-suppressing agents, anti-static agents, anti-blocking agents, heat, electric and magnetic conductive materials (i.e. materials that can help for inductive heating), and reinforcing fibrous additives and reinforcing non-fibrous additives.

These above mentioned optional ingredients are commonly known to the skilled in the art.

As non limitative examples of colorants mention can be made of water-soluble dyes, oil-soluble dyes, water-insoluble coloured lakes, and mixtures thereof.

As non limitative examples of pigments mention can be made of titanium dioxide, zinc sulfide and zinc oxide.

As non limitative examples of light stabilizers mention can be made of UV absorbers and hindered amine light stabilizers.

As non limitative examples of antioxidants mention can be made of organic phosphites and phosphonites.

As non limitative examples of conductivity additives mention can be made carbon black and carbon nanofibrils.

As non limitative examples of reinforcing fibrous additives mention can be made of glass fibers, carbon fibers, and wollastonite.

Glass fibers optionally comprised in polymer composition (C) may be chosen from the group composed of chopped strand A-, E-, C-, D-, S-, T- and R-glass fibers, as described in chapter 5.2.3, p. 43-48 of Additives for Plastics Handbook, $2^{nd}$ edition, John Murphy. Said glass fibers may have a circular cross-section or a non-circular cross-section (such as an oval or rectangular cross-section). When the glass fibers used have a circular cross-section, they preferably have an average fiber diameter of 3 to 30 µm and particularly preferred of 5 to 12 µm. Different sorts of glass fibers with a circular cross-section are available on the market depending on the type of the glass they are made of.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof. Carbon nanofibers and single and multiwalled carbon nanotubes can also be used as reinforcing additives as part of the compositions of this invention.

As non limitative examples of reinforcing non-fibrous additives, mention can be made of talc, mica, kaolin, calcium carbonate, calcium silicate magnesium carbonate. Non-fibrous reinforcing additives that can be used also include graphite and graphene (which is referred to in some instances as nano-graphite or graphitic nano-platelets, GNP).

According to certain embodiments, the total weight of polymer (PEKK$_{low}$) and polymer (PEKK$_{high}$), based on the total weight of the inventive composition (C), is advantageously equal to or above 60 wt. %, preferably equal to or above 70 wt. %; more preferably equal to or above 80 wt. %, more preferably equal to or above 85 wt. %, most preferably equal to or above 90 wt. %.

According to certain embodiments, the inventive composition (C) does not comprise any other polyaryletherketone polymer [polymer (PAEK)] beside polymer (PEKK$_{low}$) and polymer (PEKK$_{high}$). In other terms, the inventive composition (C) according to these embodiments is generally substantially free from any polymer, comprising recurring units, more than 50% moles of said recurring units are recurring units (R*$_{PAEK}$) comprising a Ar*—C(O)—Ar*' group, with Ar* and Ar*', equal to or different from each other, being aromatic groups, which is not polymer (PEKK$_{low}$) or polymer (PEKK$_{high}$). Recurring units (R*$_{PAEK}$) of polymer (PAEK) have same features already described above in connection with the optional recurring units (R$_{PAEK}$) of polymers (PEKK).

When used, the total weight of the nitride (NI) in the composition (C) of the present invention is advantageously of at least about 0.1 wt. %, generally at least about 0.2 wt. %, preferably at least about 0.3 wt. %, more preferably at least about 0.5 wt. %, and/or of at most about 10 wt. %, preferably at most about 8 wt. %, more preferably at most about 5 wt. %, and even more preferably at most about 3 wt. %, based on the total weight of the composition (C).

When an additional optional ingredient is present in the composition (C) of the invention, the total weight of the optional ingredient, based on the total weight of the composition (C), is advantageously equal to or above 0.1 wt. %, preferably equal to or above wt. 0.5%, more preferably equal to or above 1 wt. % and even more preferably more preferably equal to or above 2 wt. %, and/or equal to or below 30 wt. %, preferably below 20 wt. %, more preferably below 10 wt. % and even more preferably below 5 wt. %, based on the total weight of the composition (C).

According to certain embodiments, the composition (C) of the present invention essentially consists of polymer (PEKK$_{low}$) and polymer (PEKK$_{high}$), as described above. For the purpose of the present invention, the expression "consisting essentially of" is to be understood to mean that any additional component different from those listed, is present in an amount of at most 1 wt. %, preferably at most 0.5 wt. %, based on the total weight of the composition (C), so as not to substantially alter the advantageous properties of the composition.

According to other embodiments, the composition (C) of the present invention essentially consists of polymer (PEKK$_{low}$), polymer (PEKK$_{high}$), and nitride (NI), as described above.

According to still other embodiments, the composition (C) of the present invention essentially consists of polymer (PEKK$_{low}$), polymer (PEKK$_{high}$), and one or more than one additional ingredient other than nitride (NI), as listed above. According to these embodiments, the composition © may comprise nitride (NI), as described above.

The composition (C) can be prepared by a variety of methods involving intimate admixing of polymer (PEKK$_{low}$), polymer (PEKK$_{high}$), possibly with nitride (NI) and/or with any optional additional ingredient, as detailed above, as desired in the formulation. For example dry (or powder) blending, suspension or slurry mixing, solution mixing, melt mixing or any combination thereof can be used. As used herein, the "other constituents" of the composition (C) includes any other constituent which is desired in the composition (C) on top of polymer (PEKK$_{low}$) and polymer (PEKK$_{high}$), including possibly the nitride (NI) or any of additional optional ingredients listed above.

The composition (C) may be prepared by a method comprising solubilizing polymer (PEKK$_{low}$) and polymer (PEKK$_{high}$), possibly in combination with other constituents, in a medium which is liquid at the temperature of the solubilization. Indeed, such solubilization may be accompanied by heating polymer (PEKK$_{low}$) and polymer (PEKK$_{high}$), in said liquid medium, which may advantageously comprise at least one of diphenylsulfone, benzophenone, 4-chlorophenol, 2-chlorophenol, and meta-cresol. A suitable liquid medium for effectively solubilizing polymer (PEKK$_{low}$) and polymer (PEKK$_{high}$), is diphenyl sulfone (DPS), which is liquid beyond 123° C., or blends of organic solvents comprising a major amount of DPS. When DPS is used, the mixing is achieved by heating at a temperature of at least 250° C., preferably at least 275° C., more preferably at least 300° C. Good results have been obtained when solubilizing polymer (PEKK$_{low}$) and polymer (PEKK$_{high}$) in DPS at a temperature of about 330° C.

The composition (C) of the invention can be recovered from the liquid medium by standard techniques, including liquid/solid separations, crystallization, extraction, etc.

When DPS is used, the solubilized polymer (PEKK$_{low}$) and polymer (PEKK$_{high}$) in liquid DPS is cooled below melting point of DPS, so as to obtain a solid which, possibly after grinding, is extracted with a mixture of acetone and water, possibly rinsed with an aqueous medium, and finally dried to yield the composition of the invention.

As an alternative, the composition (C) of the invention may be manufactured for example by melt mixing or a combination of powder blending and melt mixing. Powder blending is practicable when polymer (PEKK$_{low}$) and polymer (PEKK$_{high}$), and optionally the other constituents, are provided under the form of powders. Typically, the powder blending of polymer (PEKK$_{low}$) and polymer (PEKK$_{high}$), as above detailed, may be carried out by using high intensity mixers, such as notably Henschel-type mixers and ribbon mixers.

It is also possible to manufacture the composition of the invention by melt compounding polymer (PEKK$_{low}$) and polymer (PEKK$_{high}$), and optionally the other constituents, and/or by further melt compounding the powder mixture as above described. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents, it is advantageously possible to obtain strand extrudates of the composition (C) of the invention. Such strand extrudates can be chopped by means e.g. of a rotating cutting knife after some cooling time on a conveyer with water spray, so as to provide composition (C) under the form of pellets or breads. Thus, pellets or beads of the composition (C) can then be further used for the fabrication of parts or composites, or may be grinded to provide powdery composition (C) for powder fabrication techniques.

Shaped Articles and Methods of Making

Additional embodiments of the present invention are shaped articles comprising the inventive composition (C) and methods of making the said shaped articles.

The shaped article can include one or more parts. When the shaped article is a single part, the single part preferably consists of the inventive composition (C).

Alternatively, the shaped article may consist of more than one part, one or more of which preferably consists of the inventive composition (C). When more than one part of the shaped article includes the composition (C), each part may include the same polymer composition or a different polymer composition as described herein.

The weight of the inventive composition (C), based on the total weight of shaped article, is preferably greater than 1%, greater than 5%, greater than 10%, preferably greater than 15%, greater than 20%, greater than 30%, greater than 40%, greater than 50%, greater than 60%, greater than 70%, greater than 80%, greater than 90%, greater than 95%, greater than 99%.

The inventive composition (C), may be well suited for the manufacture of articles useful in a wide variety of applications. For example, the surprising and advantageous properties of the inventive composition (C), described herein, make the inventive composition (C) especially suitable for use in automotive applications such as magnet wire coatings in hybrid and electric vehicles, oil and gas applications such as structural parts for extraction tools, down-hole cable coatings, and the like; as structural components for mobile electronic devices (e.g., framework or housing), as thermoplastic matrix for thermoplastic composites for structural and transportation applications; as binder films or adhesives for fusing together laminates, in particular for bonding metal surfaces, (thermoplastic) composite laminates surfaces, aramid film surfaces, pre-peg surfaces, and the like; electrostatic powder coatings on metal substrates for corrosion protection and abrasion resistance, and parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons.

In particular, the inventive composition (C) is very well suited for use as a coating for wires or cables, as a structural part of a mobile electronic devices, or as a part produced by additive manufacturing. Thus, exemplary embodiments also include shaped articles made, at least in part, by the additive manufacturing methods using the polymer composition described above. Such shaped articles can be used in a variety of final applications such as implantable medical devices, dental prostheses, and brackets and complex shaped parts in the aerospace and automotive industries.

In particular, the inventive composition (C) is well-suited for use as thermoplastic matrix of a continuous fiber reinforced composite.

In other embodiments, the inventive composition (C) is useful for being used under the form of a tie layer positioned between and in contact with a first substrate and a second substrate, to ensure satisfactory adhesion among the said substrates, whereas said substrates may be notably metal substrates, thermoplastic composite substrates, aramid film substrates, pre-preg substrates.

The shaped articles described herein can be made from the inventive composition (C) by injection molding, extrusion, compression molding, additive manufacturing (also called three-dimensional (3D) printing, for which the shaped articles may also be called 3D objects or 3D parts), coating, continuous fiber impregnation, and continuous fiber composite lamination/consolidation or other shaping technologies.

In some embodiments, the method of making the shaped article or part thereof includes a step of compression molding or injection molding, and subsequent solidification of the inventive composition (C).

In some embodiments, the method for making the shaped article or shaped article or part thereof includes a step of coating. For example, the inventive composition (C) can be applied to a wire as a coating by any suitable coating method, preferably by extrusion coating around a wire to form a coated wire, preferably a coated magnet wire.

Exemplary embodiments are also directed to methods of making shaped articles by additive manufacturing, where the shaped article is printed from the inventive composition (C), also called "part material". The methods include printing layers of the shaped article from the polymer composition as described below.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF), also known as Fused Deposition Modelling (FDM). Pellet Additive Manufacturing (PAM) is an example of a 3D printing method capable of printing raw materials as pellets.

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermosplastic Printing (FRTP) method. This method is based on fused-deposition modeling (FDM) and prints a combination of fibers and resin.

Method of Making a Composite

Additional exemplary embodiments are directed to methods of making composites comprising impregnating the reinforcing fibers with a matrix of the inventive composition (C) described herein, and composite materials obtained therefrom.

Various methods can be employed by which fibers may be impregnated with the matrix of the inventive composition (C), wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with the polymer matrix. As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray microtomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. If necessary, a tie layer made from the inventive composition (C) may be used for adhering layers of the unconsolidated laminate. Such tie-layer may be provided as a self-supported film made of the inventive composition (C) or may be provided under the forma of a coating, which is coated onto at least one of the surfaces of the layers of the unconsolidated composite laminate to be assembled and consolidated.

As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x ray microtomography.

The composite material of the invention preferably comprises from 20 to 80 wt. % of reinforcing fibers and from 80 to 20 wt. % of a matrix of the inventive composition (C), based on the weight of the composite material.

Method of Making an Assembly

Additional exemplary embodiments are directed to methods of making an assembly comprising a first substrate layer and a second substrate layer, said method comprising positioning a tie-layer made from the inventive composition (C) between and in contact with the said first substrate and the said second substrate; and assemblies obtained therefrom.

One or both of the substrate layers joined by the tie layer can, for example, be a sheet or a thin film. The substrate layers may be comprised of any suitable material such as, for example, metal, plastic (thermoplastic or thermoset), ceramic, or glass, or of a composite material, including notably a composite material, as described above. The thickness of the thin film or of the sheet can be suitably chosen and can be, for example, from approximately 0.01 to approximately 10 mm.

Suitable crystalline and/or high temperature thermoplastics which may be comprised in the plastic substrate layers include, but are not limited to, polyaryletherketones (such as crystalline polyetherketone (PEK), crystalline polyetheretherketone (PEEK), crystalline polyetherketoneketone (PEKK), polyetheretheretherketone (PEEEK), polyetheretherketoneetheretherketone (PEEKK), polyetherketoneetheretherketone (PEKEKK), and polyetherketoneketoneketone (PEKKK)), polyimides, polyetherimides, polyamideimides, polysulfones, polyethersulfones, polyarylethers, polycarbonates, liquid crystal polymers, polyphenylene sulfides, polyarylenes (polyphenylenes), polyamides, polyphthalamides, polyaromatic esters and the like.

In another embodiment, at least one of either the first substrate layer or the second substrate layer is metallic, e.g., a metal sheet, foil, or the like. The substrate may be comprised of any suitable metal or metal alloy such as steel, aluminum, aluminum alloy, copper, gold, silver or the like.

The assemblies of the invention can be manufactured by co-extrusion into any conventional form, including film, plate, sheeting, tubing or any other shape conventionally obtainable by coextrusion, in particular when constituents of the substrate layers are melt-processable thermoplasts.

Compression molding, intermittent matched die consolidation, double belt press consolidation, composite roll forming, transfer molding, as well as other such techniques can also be utilized in connection with the present invention. For example, the assembly may be prepared by placing a sheet or film made from the inventive composition (C) (corresponding in to the desired tie layer) between a first substrate layer and a second substrate layer and heating the resulting "sandwich" at a temperature effective to soften at least one of the layers sufficiently to enable it to flow and come into intimate contact with an adjacent layer, thereby forming an adhesive bond when the assembly is cooled. Typically, it will be desirable to apply pressure on the "sandwich" so as to enhance the degree of adhesion achieved between the tie layer and the substrate layers. Thermoforming of the assembly can be carried out so as to attain a particular desired shape or contour.

Assemblies of the present invention may be utilized in any of the end use applications where such laminates or composites conventionally are employed or have been proposed to be employed. Representative applications include composites and laminates (including two- and three dimensional panels and sheets) for aerospace/aircraft, automobiles and other vehicles, boats, machinery, heavy equipment, storage tanks, pipes, sports equipment, tools, biomedical devices (including devices to be implanted into the human body), building components, wind blades and the like.

Should the disclosure of any patents, patent applications, and publications which are incorporated herein by reference conflict with the description of the present application to the extent that it may render a term unclear, the present description shall take precedence.

EXAMPLES

The disclosure will be now described in more detail with reference to the following examples, whose purpose is merely illustrative and not intended to limit the scope of the disclosure.

Section I: PEKK Polymers Synthesis and Example Compositions Produced by Solution-Blending The following Examples demonstrate the synthesis of PEKK copolymers, their thermal properties and mechanical properties.

Raw Materials 1,2-dichlorobenzene, terephthaloyl chloride, isophthaloyl chloride, 3,5-dichlorobenzoylchloride, aluminum chloride ($AlCl_3$), methanol were purchased from Sigma Aldrich.

1,4-Bis(4-phenoxybenzoyl)benzene was prepared according to IN patent 193687 (filed on Jun. 21, 1999 and incorporated herein by reference).

Diphenyl sulfone (polymer grade) was procured from Proviron (99.8% pure).

Sodium carbonate, light soda ash, was procured from Solvay S.A., France and dried before use. Its particle size was such that its $d_{90}$ was 130 μm.

Potassium carbonate with a $d_{90}$<45 μm was procured from Armand products and dried before use.

Lithium chloride (anhydrous powder) was procured from Acros.

$NaH_2PO_4 \cdot 2H_2O$ and $Na_2HPO_4$ were purchased from Sigma-Aldrich.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Determination of the Melt Flow Index

The melt flow index was determined according to ASTM D1238 at the indicated temperature (340 to 380° C. depending on the melting point of the material) with a 3.8 kg weight. The final MFI for a 8.4 kg weight was obtained by multiplying the value obtained by 2.35.

Determination of the Glass Transition Temperature, Melting Temperature and Heat of Fusion The glass transition temperature $T_g$ (mid-point, using the half-height method) and the melting temperature $T_m$ were determined on the $2^{nd}$ heat scan in differential scanning calorimeter (DSC) according to ASTM D3418-03, E1356-03, E793-06, E794-06, further according to the details below. Detailed procedure as used in this invention is as follows: a TA Instruments DSC Q20 was used with nitrogen as carrier gas (99.998% purity, 50 mL/min). Temperature and heat flow calibrations were done using indium. Sample size was 5 to 7 mg. Hermetically sealed pans were used. The weight was recorded ±0.01 mg. The heat cycles were:

$1^{st}$ heat scan: 30.00° C. to 400.00° C. at 20.00° C./min, isothermal at 400.00° C. for 1 min;

$1^{st}$ cool scan: 400.00° C. to 30.00° C. at 20.00° C./min, isothermal for 1 min;

$2^{nd}$ heat scan: 30.00° C. to 400.00° C. at 20.00° C./min, isothermal at 400.00° C. for 1 min.

The melting temperature $T_m$ was determined as the peak temperature of the melting endotherm on the $2^{nd}$ heat scan. The enthalpy of fusion was determined on the $2^{nd}$ heat scan and was taken as the area over a linear baseline drawn from above the $T_g$ to a temperature above end of the endotherm peak. The crystallization temperature $T_c$ was determined as the peak temperature of the crystallization exotherm on the $1^{st}$ cool scan. The possible presence of a cold crystallization was determined from $2^{nd}$ heat scan: the presence of an exotherm before on-set of endothermic melting peak was positively confirmed when an exotherm heat flow exceeding 0.5 J/g was spotted.

Determination of Elemental Impurities Such as Aluminum in Polymer Composition by ICP-OES A clean, dry platinum crucible was placed onto an analytical balance, and the balance was zeroed. One half to 3 grams of polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample. Following ashing, the furnace was cooled down to room temperature, and the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation: $A=(B*C)/(D)$ where:
A=concentration of element in the sample in mg/kg (=wt·ppm)
B=element in the solution analyzed by ICP-OES in mg/L
C=volume of the solution analyzed by ICP-OES in mL
D=sample weight in grams used in the procedure.

Determination of Fluorine Concentration in Polymers by Combustion Ion Chromatography Method For combustion ion chromatography (IC) analysis a clean, pre-baked, dry ceramic sample boat was placed onto an analytical balance, and the balance was zeroed. Approximately 20 mg of polymer sample was weighed into the boat and weight was recorded to 0.0001 g. The boat with sample was placed in the combustion furnace set with an inlet temperature of 900° C. and an outlet temperature of 1000° C. The combusted sample and argon carrier gas is passed through 18.2 MΩ ultrapure water, and injected autonomously into an IC system equipped with a conductivity detector.

Combustion IC analysis was performed using a Dionex ICS 2100 IC system, equipped with a Dionex IonPac AS19 IC column and guard column (or equivalent), Dionex CRD 200 4 mm suppressor set at 50 mA, as well as a, GA-210 gas absorption unit HF-210 furnace, and ABC-210 boat controller, all from Mitsubishi Analytech.

The elution gradient for the method is as follows:
0-10 minutes: 10 mM KOH
10-15 minutes: steady, constant increase to 20 mM KOH
15-30 minutes: 20 mM KOH The instrument was calibrated using a 3-point calibration from a NIST traceable 7-anion mixture supplied by AllTech with analyte concentration between 0.1-3.0 mg/L for $F^-$. A linear calibration curve was obtained in a whole range of concentrations with a correlation coefficient better than 0.9999 for each analyte. A control sample is run to verify the machine is operating correctly before any samples are analyzed. The concentration of anions in the sample was calculated with the following equation:

$A=(B*C)/(D)$ where:

A=concentration of element in the sample in mg/kg
B=anion in the solution analyzed by IC in mg/L
C=volume of the solution analyzed by IC in mL
D=sample weight in mg used in the procedure.

Comparative Preparative Example 1: Preparation of Electrophilic PEKK (e-PEKK) with T/I=72/28

In a 2000 mL 4-neck reaction flask fitted with a stirrer, a dry $N_2$ inlet tube, a thermocouple plunging in the reaction medium, and a condenser were introduced 1000 g 1,2-dichlorobenzene and 40.63 g 1,4-Bis(4-phenoxybenzoyl) benzene. Under a sweep of dry nitrogen, 7.539 g of terephthaloyl chloride, 9.716 g of isophthaloyl chloride and 0.238 g of benzoyl chloride were then added to the reaction mixture. The reactor was then cooled to −5° C. and 71.88 g of aluminium chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C. The solid was then removed by filtration on a Buchner. The wet cake was rinsed on the filter with an additional 188 g of methanol. The wet cake was then re-slurried in a beaker with 440 g of methanol for 2 hours. The polymer solid was filtered again on Buchner funnel and the wet cake was rinsed on the filter with 188 g of methanol. The solid was slurried with 470 g of an aqueous hydrochloric acid solution (3.5 wt %) for 2 hours. The solid was then removed by filtration on a Büchner. The wet cake was rinsed on the filter with an additional 280 g of water. The wet cake was then re-slurried in a beaker with 250 g of 0.5N sodium hydroxide aqueous solution for 2 hours. The wet cake was then re-slurried in a beaker with 475 g of water and filtered on Buchner funnel. The last water washing step was repeated 3 more times. The polymer is then slurried with 0.75 g of an aqueous solution containing 6.6 wt % of $NaH_2PO_4.2H_2O$ and 3.3 wt % of $Na_2HPO_4$. then dried in a vacuum oven at 180° C. for 12 hours. The melt flow index (360° C., 8.4 kg) was 82.g/10 min.

TABLE 1

| | | Comparative Preparative Examples 2 to 4 | | | |
|---|---|---|---|---|---|
| Reagent | | Ex. 1CP (72/28 low MV) | Ex. 2CP (60/40 high MV) | Ex. 3CP (60/40 low MV) | Ex. 4CP (82/18 low MV) |
| 1,2-dichlorobenzene | g | 1000 | 1600 | 1600 | 1600 |
| 1,4-Bis(4-phenoxybenzoyl)benzene | g | 40.63 | 65.00 | 65.00 | 65.00 |
| terephtaloyl chloride | g | 7.539 | 5.400 | 5.400 | 10.000 |
| isophthaloyl chloride | g | 9.716 | 22.200 | 22.200 | 17.600 |
| benzoyl chloride | g | 0.238 | 0.200 | 0.380 | 0.380 |
| Aluminium chloride | g | 71.88 | 115.00 | 115.00 | 115.00 |
| MFI | g/10 min | 82 | 33 | 116 | 118 |
| MFI T | °C. | 360 | 340 | 340 | 380 |
| Al content | ppm | >10 ppm (55 ppm) | >10 ppm (25 ppm) | >10 ppm (21 ppm) | >10 ppm (35 ppm) |
| F content | ppm | <100 ppm | <100 ppm | <100 ppm | <100 ppm |

Comparative Preparative Examples 2 to 4 e-PEKK with T/I=60/40 and 82/18, of Different Molecular Weights The same procedure as example 1 was followed but with the amounts of reagents indicated in the table below.

Preparative Example 5: Synthesis of Nucleophilic PEKK (n-PEKK) 71/29 Low MV

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone (DPS), 23.054 g of 1,3-BHBB, 16.695 g of 1,4-BHBB and 41.292 g of 1,4-DFDK. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 270° C. At 270° C., 13.725 g of $Na_2CO_3$ and 0.078 g of $K_2CO_3$ was added via a powder dispenser to the reaction mixture over 60 minutes. At the end of the addition, the reaction mixture was heated to 310° C. at 1° C./minute. After 2 minutes at 310° C., 1.107 g of 1,4-DFDK were added to the reaction mixture while keeping a nitrogen purge on the reactor. After 5 minutes, 0.741 g of lithium chloride were added to the reaction mixture. 10 minutes later, another 0.402 g of 1,4-DFDK were added to the reactor and the reaction mixture was kept at temperature for 15 minutes. Another charge of 15 g of diphenyl sulfone was added to the reaction mixture, which was kept under agitation for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

Preparative Examples 6 to 13: Synthesis of Nucleophilic PEKK (n-PEKK) with Variable T/I and/or Different Melt Viscosity (MV)

The same procedure as example 5 was followed but with the amounts of reagents indicated in the table below.

TABLE 2

| | | Examples n-PEKK with T/I = 58/42 to 69/31 | | | |
|---|---|---|---|---|---|
| | | Example | | | |
| Reagent | | 5P low MV | 6P high MV | 7P low MV | 8P |
| T/I | | 71/29 | 58/42 | 58/42 | 60/40 |
| DPS | g | 112.50 | 112.50 | 112.50 | 112.50 |
| 1,3-BHBB | g | 23.054 | 33.389 | 33.389 | 31.799 |
| 1,4-BHBB | g | 16.695 | 6.360 | 6.360 | 7.950 |
| 1,4-DFDK | g | 41.292 | 41.292 | 41.413 | 41.413 |
| $Na_2CO_3$ | g | 13.725 | 13.725 | 13.725 | 13.725 |
| $K_2CO_3$ | g | 0.078 | 0.078 | 0.086 | 0.086 |
| 1,4-DFDK | | 1.107 | 0.906 | 1.006 | 0.805 |
| LiCl | | 0.741 | 0.953 | 0.529 | 0.529 |
| 1,4-DFDK | | 0.402 | 0.402 | 0.402 | 0.402 |
| DPS | | 15 | 40 | 25 | 25 |
| MFI | g/10 min | 100 | 33 | 100 | 90 |
| MFI T | °C. | 360 | 340 | 340 | 340 |
| Al content | ppm | <10 | <10 | <10 | <10 |
| F content | ppm | >100 | >100 | >100 | >100 |

TABLE 2-continued

Examples n-PEKK with T/I = 58/42 to 69/31

| Reagent | | 9P | 10P | 11P | 12P | 13P |
|---|---|---|---|---|---|---|
| T/I | | 61/39 | 63/37 | 65/35 | 67/33 | 69/31 |
| DPS | g | 112.50 | 112.50 | 112.50 | 112.50 | 112.50 |
| 1,3-BHBB | g | 31.004 | 29.414 | 27.824 | 26.234 | 24.644 |
| 1,4-BHBB | g | 8.745 | 10.335 | 11.925 | 13.515 | 15.105 |
| 1,4-DFDK | g | 41.413 | 41.413 | 41.413 | 41.413 | 41.413 |
| $Na_2CO_3$ | g | 13.725 | 13.725 | 13.725 | 13.725 | 13.725 |
| $K_2CO_3$ | g | 0.086 | 0.086 | 0.086 | 0.086 | 0.086 |
| 1,4-DFDK | | 0.805 | 0.805 | 0.805 | 0.805 | 0.805 |
| LiCl | | 0.529 | 0.529 | 0.529 | 0.529 | 0.529 |
| 1,4-DFDK | | 0.402 | 0.402 | 0.402 | 0.402 | 0.402 |
| DPS | | 25 | 25 | 25 | 25 | 25 |
| MFI | g/10 min | 95 | 87 | 85 | 80 | 100 |
| MFI T | °C. | 340 | 360 | 360 | 360 | 360 |
| Al content | ppm | <10 | <10 | <10 | <10 | <10 |
| F content | ppm | >100 | >100 | >100 | >100 | >100 |

General Procedure for Solution Blending of Various PEKKs

In a 500 mL 4-neck reaction flask fitted with a stirrer, a $N_2$ inlet tube, a Claisen adapter with a thermocouple plunging in the reaction medium, and a condenser were introduced 235.00 g of diphenyl sulfone (DPS), and optionally boron nitride (see table 3), The flask content was heated slowly to 330° C. At 330° C., 100 g of a blend of polymer powder in the proportions indicated in table 3 were slowly added via a flex tube into the molten DPS. At the end of the addition, the agitation speed was increased to provide good mixing and the mixture was held at 330° C. for another hour.

The reactor content was then poured from the reactor into a stainless steel pan and cooled. The solid was broken up and ground in an attrition mill through a 2 mm screen. Diphenyl sulfone was extracted from the mixture with acetone and water. 0.67 g of $NaH_2PO_4\text{-}2H_2O$ and 0.62 g of $Na_2HPO_4$ were dissolved in 1200 mL DI water for the last wash. The powder was then removed from the reactor and dried at 120° C. under vacuum for 12 hours yielding 90-95 g of a yellow powder.

TABLE 3

Compositions manufactured by solution blending

| | Example | | | | | | | |
|---|---|---|---|---|---|---|---|---|
| | 14 | CE15 | CE16 | 17 | 18 | 19 | 20 | 21 |
| Boron nitride pph | | | | | | | | 1.2 |
| ePEKK Ex. 1CP Wt % | | | 15 | | | | | |
| ePEKK Ex. 2CP Wt % | | 65 | 85 | | | | | |
| ePEKK Ex. 3CP Wt % | | | | | | | | |
| ePEKK Ex. 4CP Wt % | | 35 | | | | | | |
| n-PEKK Ex. 5P Wt % | 15 | | | 5 | 10 | 15 | 20 | 15 |
| n-PEKK Ex. 6P Wt % | 85 | | | | | | | |
| n-PEKK Ex. 7P Wt % | | | | 95 | 90 | 85 | 80 | 85 |

The thermal properties (DSC at 20° C./min up to 400° C.) of copolymers with different T/I ratios (examples 7-13) and solution blends of n-PEKK (examples 17-21) are presented in table 4. In said Table, $T_g$ is the glass transition temperature; $T_m$ is the melting temperature, $T_c$ is the crystallization temperature; Eq. 1 is the inequality: $T_c \geq 1.3716 * T_m - 190°$ C.; $T_c*_{min}$ per Eq. 1 is the theoretical minimum $T_c$, corresponding to the measured $T_m$, so as to satisfy the inequality above, computed as $T_c*_{min} = 1.3716 * T_m - 190°$ C. Criterion of Eq. 1 is labelled as met [Y (pass)] in Table 4, when measured $T_c$ is $\geq T_c*_{min}$, or otherwise said, when measured $T_c \geq 1.3716 * T_m - 190°$ C. Cold crystallization test is labelled as "Yes (Fail)" when a exotherm exceeding 0.5 J/g was measured, while test result is labelled as "No (Pass)" when no detectable exotherm was measured.

TABLE 4

Thermal properties as determined by DSC

| | Type | $T_g$ °C. | $T_m$ °C. | $T_c$ °C. | $\Delta H_f$ J/g | Cold crystallization? | $T_c*$ min per Eq. 1 °C. | Meets Eq. 1 Criterion? |
|---|---|---|---|---|---|---|---|---|
| 5P | copolymer | 162 | 343 | 280 | 46 | N (pass) | 281 | N (fail) |
| 6P | copolymer | 161 | 298 | n.d. | 4 | Y (fail) | 220 | N (fail) |
| 7P | copolymer | 159 | 296 | 221 | 20 | Y (fail) | 216 | Y (pass) |
| 8P | copolymer | 160 | 306 | 208 | 3 | N (pass) | 230 | N (fail) |
| 9P | copolymer | 159 | 310 | 215 | 14 | Y (fail) | 235 | N (fail) |
| 10P | copolymer | 161 | 316 | 237 | 33 | N (pass) | 243 | N (fail) |
| 11P | copolymer | 162 | 323 | 250 | 37 | N (pass) | 253 | N (fail) |
| 12P | copolymer | 163 | 329 | 237 | 40 | N (pass) | 261 | N (fail) |
| 13P | copolymer | 162 | 336 | 266 | 44 | N (pass) | 271 | N (fail) |
| 17 | blend | 159 | 302 | 239 | 34 | N (pass) | 224 | Y (pass) |
| 18 | blend | 159 | 308 | 245 | 28 | N (pass) | 232 | Y (pass) |
| 19 | blend | 159 | 317 | 250 | 31 | N (pass) | 245 | Y (pass) |
| 20 | blend | 158 | 327 | 275 | 39 | N (pass) | 259 | Y (pass) |
| 21 | blend | 159 | 319 | 256 | 31 | N (pass) | 248 | Y (pass) |

As shown by data collected above, copolymers PEKK per se having lower melting points, are generally poorly crystalline, exhibit cold crystallization behavior, and have a significant gap between $T_c$ and $T_m$ (hence failing in Eq. 1) as indication of slow crystallization rates; copolymers PEKK per se having higher melting point are intrinsically poorly processable, and while possessing suitable crystallinity, equally display a significant gap between $T_c$ and $T_m$ (hence failing in Eq. 1) as indication of slow crystallization rates. On the contrary, the data above, which are also depicted in The FIGURE, well demonstrate that the blends according to the present invention are endowed with a higher $T_c$ than copolymers possessing same $T_m$, with heat of fusion $\Delta H_f$ exceeding 25 J/g, i.e. acceptably high crystallinity. Consequently, as already explained, this means that the inventive blends allow to reach a better combination of improved processing (as evidenced by their lower $T_m$, which is kept below 330° C.) combined with faster crystallization rates (as evidenced by higher $T_c$) and suitable final crystalline fraction (as evidenced by $\Delta H_f$). Overall, the blends according to the invention present:

A $T_m \leq 330°$ C.
A heat of fusion $\Delta H_f > 25$ J/g
No cold crystallization peak on the $2^{nd}$ heat scan
a $T_c$ meeting the equation $$T_c \geq 1.3716 * T_m - 190°\ \text{C.} \qquad \text{[Equation 1]}$$

with $T_m$ and $T_c$ having the meaning indicated above.

Data provided in Table 5 below further demonstrate that these advantageous effects are solely achieved with blends whereas use is made of nucleophilic PEKK. Table 5 compares performances obtained in Ex. 14 (blend of nPEKK of Ex. 6 and nPEKK of Ex. 5) with respect to unsatisfactory results achieved with blends of ePEKKs.

TABLE 5

Thermal properties as determined by DSC

| | Type | $T_g$ ° C. | $T_m$ ° C. | $T_c$ ° C. | $\Delta H_f$ J/g | Cold crystallization? | $T_c$ * min per Eq. 1 | Meets Eq. 1 Criterion? |
|---|---|---|---|---|---|---|---|---|
| 14 | n-PEKK$_{low}$ + n-PEKK$_{high}$ | 161 | 315 | 245 | 32 | N (pass) | 242 | Y (pass) |
| 16C | e-PEKK$_{low}$ + e-PEKK$_{high}$ | 157 | 307 | 236 | 19 | Y (fail) | 231 | Y (pass) |
| 15C | e-PEKK$_{low}$ + e-PEKK$_{high}$ | 160 | 347 | 261 | 38 | N (pass) | 286 | N (fail) |

Data provided in Table 5 below further demonstrate that these advantageous effects are solely achieved with blends whereas use is made of nucleoplhilic PEKK. Table 5 compares performances obtained in Ex. 14 (blend of 85% of nPEKK T/I=58/42 of Ex. 6 and 15% nPEKK T/I=71/29 of Ex. 5) with respect to unsatisfactory results achieved with blends of ePEKKs, in particular as obtained in Ex. 16C (blend of 85% of ePEKK T/I=60/40 of Ex. 2CP and 15% ePEKK T/I=72/28 of Ex. 1CP), which is strictly similar. In Ex. 16C, crystallinity achieved is too low (19 J/g), and cold crystallization phenomena occur, as an indication of slow crystallization kinetics. Ex. 15C is also somewhat failing, as the gap between melting point and crystallization temperature is too broad for enabling effective crystallization, as clear evidence that the nucleophilic nature of the PEKK employed is key for achieving the optimized properties' compromise.

General Procedure for the Preparation of Inventive Compositions by Melt-Blending The compositions in the following set of examples were prepared by melt blending in a twin-screw extruder, the details of which are described further below. The PEKK starting materials were n-PEKK polymers the preparation of which was described above.

Raw Materials:
  n-PEKK from Ex. 6P: T/I=58/42 high MV
  n-PEKK from Ex. 7P: T/I=58/42 low MV
  n-PEKK from Ex. 9P: T/I=61/39
  n-PEKK from Ex. 5P: T/I=71/29
  PEEK: KT-880UFP a low viscosity grade of PEEK polymer available commercially from Solvay Specialty Polymers. It has a melt viscosity in the range 0.12-0.18 kPa-s as measured according ASTM D3835 at a temperature of 400° C. and a shear rate of 1000 1/s, using a capillary die 3.175 mm in length and 0.5 mm in length and having an entrance angle of 120 degrees.
  Boron nitride: Boronid® S1-SF, a hexagonal boron nitride grade available commercially from 3M Corporation Blends Preparation All the compositions described in this section were prepared by melt blending using a Leistritz 18 mm twin-screw co-rotating intermeshing extruder having a length to diameter ratio (L/D) of 30. The ingredients which were all in either powder or pellet form, were in each case first tumble blended according to the compositional ratios shown in the forthcoming examples tables. The tumble-blending was done for about 20 minutes, followed by melt compounding using the above described extruder. The extruder had 6 barrel sections with barrel sections 2 through 6 being heated. Vacuum venting with a vacuum level of >25 in Hg was applied at barrel section 5 during compounding to strip off moisture and any possible residual volatiles from the compound. The extrudate was in each case stranded on a conveyor belt, air cooled, and fed to a pelletizer which cut it into pellets approximately 3 mm in diameter and 3 mm in length. Other compounding conditions were as follows: barrel sections 2-6 as well as the die section were heated to 360° C. The extruder was operated at a screw speed of about 200 rpm and the throughput rate was about 6 lb/hr.

TABLE 6

Examples that illustrate blends of PEKK (Ex. 9P) T/I = 61/39 with addition of PEKK of Ex. 5P as compared to the addition of another polyaryletherketone polymer

| | Example | | | | | | |
|---|---|---|---|---|---|---|---|
| Components | CE22 | CE23 | CE24 | CE25 | E26 | E27 | E28 |
| PEKK (Ex. 9P) | 100.0 | 99.0 | 98.0 | 97.0 | 95.0 | 90.0 | 85.0 |
| KT-880UFP | — | 1.0 | 2.0 | 3.0 | — | — | — |
| PEKK (Ex. 5P) | — | — | — | — | 5.0 | 10.0 | 15.0 |
| $T_g$ (° C.) | 162.8 | 161.2 | 163.7 | 159.6 | 162.1 | 161.6 | 162.1 |
| $T_m$ (° C.) | 309.8 | 309.5 | 309.9 | 308.9 | 311.7 | 315.3 | 319.2 |
| $T_c$ (° C.) | 234.5 | 214.8 | 214.0 | 213.2 | 242.3 | 249.5 | 255.3 |
| $\Delta H_f$ (J/g) | 33.2 | 30.9 | 29.9 | 30.0 | 36.5 | 37.5 | 39.9 |
| Cold Cryst. on | No | Yes | Yes | Yes | No | No | No |

TABLE 6-continued

Examples that illustrate blends of PEKK (Ex. 9P) T/I = 61/39 with addition of PEKK of Ex. 5P as compared to the addition of another polyaryletherketone polymer

| Components | CE22 | CE23 | CE24 | Example CE25 | E26 | E27 | E28 |
|---|---|---|---|---|---|---|---|
| $2^{nd}$ Heat? | (Pass) | (Fail) | (Fail) | (Fail) | (Pass) | (Pass) | (Pass) |
| Meets Eq. 1 Criterion? | No (Fail) | No (Fail) | No (Fail) | No (Fail) | Yes (Pass) | Yes (Pass) | Yes (Pass) |
| $T_m < 330°$ C.? | Yes (Pass) | Yes (Pass) | Yes (Pass) | Yes (Pass) | Yes (Pass) | Yes (Pass) | Yes (Pass) |

TABLE 7

Examples that illustrate addition of Boron Nitride to blends of PEKK (Ex. 6P) T/I = 58/42 and PEKK (Ex. 5P) according to the invention, and to single PEKK, as comparison

| Components | CE29 | CE30 | CE31 | Example E32 | E33 | E34 | E35 |
|---|---|---|---|---|---|---|---|
| PEKK (Ex. 6P) | 100.0 | 99.4 | 98.8 | 95.0 | 90.0 | 93.8 | 88.8 |
| Boron Nitride | — | 0.6 | 1.2 | — | — | 1.2 | 1.2 |
| PEKK (Ex. 5P) | — | — | — | 5.0 | 10.0 | 5.0 | 10.0 |
| $T_g$ (° C.) | 159.5 | 160.7 | 160.6 | 161.2 | 160.4 | 160.5 | 160.9 |
| $T_m$ (° C.) | 294.4 | 297.3 | 294.5 | 298.7 | 308.0 | 302.1 | 311.1 |
| $T_c$ (° C.) | 222.6 | 220.1 | 222.1 | 230.2 | 237.7 | 241.1 | 249.2 |
| $\Delta H_f$ (J/g) | 27.4 | 25.7 | 25.8 | 29.3 | 30.3 | 28.6 | 29.3 |
| Cold Cryst. on $2^{nd}$ Heat? | Yes (Fail) | Yes (Fail) | Yes (Fail) | No (Pass) | No (Pass) | No (Pass) | No (Pass) |
| Meets Eq. 1 Criterion? | Yes (Pass) | Yes (Pass) | Yes (Pass) | Yes (Pass) | Yes (Pass) | Yes (Pass) | Yes (Pass) |
| $T_m < 330°$ C.? | Yes (Pass) | Yes (Pass) | Yes (Pass) | Yes (Pass) | Yes (Pass) | Yes (Pass) | Yes (Pass) |

TABLE 8

Examples that illustrate modification of PEKK (Ex. 7P) T/I = 58/42 with PEKK (Ex. 5P), with or without Boron Nitride, according to the invention

| Components | E36 | CE37 | CE38 | CE39 | E40 | E41 | E42 |
|---|---|---|---|---|---|---|---|
| PEKK (Ex. 7P) | 100.0 | 99.4 | 98.8 | 98.2 | 95.0 | 90.0 | 88.8 |
| Boron Nitride | — | 0.6 | 1.2 | 1.8 | — | — | 1.2 |
| PEKK (Ex. 5P) | — | — | — | — | 5.0 | 10.0 | 10.0 |
| $T_g$ (° C.) | 159.3 | 159.3 | 159.0 | 158.7 | 159.6 | 159.0 | 158.3 |
| $T_m$ (° C.) | 295.8 | 296.0 | 296.0 | 295.3 | 300.8 | 307.7 | 313.2 |
| $T_c$ (° C.) | 211.7 | 220.2 | 222.8 | 224.6 | 232.8 | 247.1 | 253.6 |
| $\Delta H_f$ (J/g) | 27.8 | 27.0 | 29.0 | 31.8 | 33.6 | 31.5 | 32.6 |
| Cold Cryst. on $2^{nd}$ Heat? | Yes (Fail) | Yes (Fail) | Yes (Fail) | Yes (Fail) | No (Pass) | No (Pass) | No (Pass) |
| Meets Eq. 1 Criterion? | No (Fail) | Yes (Pass) | Yes (Pass) | Yes (Pass) | Yes (Pass) | Yes (Pass) | Yes (Pass) |
| $T_m < 330°$ C.? | Yes (Pass) | Yes (Pass) | Yes (Pass) | Yes (Pass) | Yes (Pass) | Yes (Pass) | Yes (Pass) |

TABLE 9

Examples that illustrate blends of PEKK (Ex. 7P) T/I = 58/42 and PEKK (Ex. 5P) according to the invention

| Components | Example | | | | | | | |
|---|---|---|---|---|---|---|---|---|
| | CE43 | E44 | E45 | E46 | E47 | E48 | E49 | E50 |
| PEKK (Ex. 7P) | 100.0 | 95.0 | 90.0 | 87.0 | 84.0 | 81.0 | 78.0 | 93.9 |
| Boron Nitride | — | — | — | — | — | — | — | 1.2 |
| PEKK (Ex. 5P) | — | 5.0 | 10.0 | 13.0 | 16.0 | 19.0 | 22.0 | 4.9 |
| Ex. 7P/Ex. 5P Ratio (wt/wt) | 100/0 | 95/5 | 90/10 | 87/13 | 84/16 | 81/19 | 78/22 | 95/5 |
| $T_g$ (°C.) | 157.8 | 159.9 | 159.7 | 159.4 | 159.8 | 158.6 | 159.8 | 159.5 |
| $T_m$ (°C.) | 296 | 300.5 | 310.9 | 306.2 | 322.0 | 314.8 | 324.5 | 299.7 |
| $T_c$ (°C.) | 209 | 228 | 246.3 | 236.8 | 262.3 | 250.4 | 264 | 234.5 |
| $\Delta H_f$ (J/g) | 22.9 | 32 | 31 | 33.4 | 36.2 | 35.3 | 37.9 | 31.6 |
| Cold Cryst. on 2$^{nd}$ Heat? | Yes (Fail) | No (Pass) | No (Pass) | No (Pass) | No (Pass) | No (Pass) | No (Pass) | No (Pass) |
| Meets Eq. 1 Criterion? | No (Fail) | Yes (Pass) | Yes (Pass) | Yes (Pass) | Yes (Pass) | Yes (Pass) | Yes (Pass) | Yes (Pass) |
| $T_m$ < 330° C.? | Yes (Pass) | Yes (Pass) | Yes (Pass) | Yes (Pass) | Yes (Pass) | Yes (Pass) | Yes (Pass) | Yes (Pass) |

| Components | Example | | | | | | | |
|---|---|---|---|---|---|---|---|---|
| | E51 | E52 | E53 | E54 | E55 | E56 | E57 | CE58 |
| PEKK (Ex. 7P) | 88.9 | 86.3 | 86.1 | 86.0 | 83.0 | 80.0 | 77.1 | — |
| Boron Nitride | 1.2 | 0.8 | 1.0 | 1.2 | 1.2 | 1.2 | 1.2 | — |
| PEKK (Ex. 5P) | 9.9 | 12.9 | 12.9 | 12.8 | 15.8 | 18.8 | 21.7 | 100.0 |
| Ex. 7P/Ex. 5P Ratio (wt/wt) | 90/10 | 87/13 | 87/13 | 87/13 | 84/16 | 81/19 | 78/22 | 0/100 |
| $T_g$ (°C.) | 159.1 | 158.7 | 159.2 | 159.2 | 158.8 | 159.4 | 159.1 | 160.6 |
| $T_m$ (°C.) | 302.1 | 315.8 | 317.3 | 313.6 | 314.5 | 319.9 | 309.1 | 344.9 |
| $T_c$ (°C.) | 243.5 | 254.7 | 256.3 | 253 | 254 | 263.3 | 253.9 | 298.8 |
| $\Delta H_f$ (J/g) | 31.5 | 33.3 | 31.8 | 32.9 | 33 | 38.9 | 33.8 | 50 |
| Cold Cryst. on 2$^{nd}$ Heat? | No (Pass) | No (Pass) | No (Pass) | No (Pass) | No (Pass) | No (Pass) | No (Pass) | No (Pass) |
| Meets Eq. 1 Criterion? | Yes (Pass) | Yes (Pass) | Yes (Pass) | Yes (Pass) | Yes (Pass) | Yes (Pass) | Yes (Pass) | Yes (Pass) |
| $T_m$ < 330° C.? | Yes (Pass) | Yes (Pass) | Yes (Pass) | Yes (Pass) | Yes (Pass) | Yes (Pass) | Yes (Pass) | No (Fail) |

The invention claimed is:

1. A composition [composition (C)] comprising:

a major amount of a first PEKK polymer [polymer (PEKK$_{low}$)] comprising recurring units (R$^T$) and recurring units (R$^I$), having a first molar content of units (R$^T$) [(T$_{low}$)] and a first molar content of units (R$^I$) [(I$_{low}$)], with $$T_{low}(\text{mol. \%}) = \frac{[\text{units } (R^T)]_{low}}{[\text{units } (R^T)]_{low} + [\text{units } (R^I)]_{low}} \times 100$$

and with $$I_{low}(\text{mol. \%}) = \frac{[\text{units } (R^I)]_{low}}{[\text{units } (R^T)]_{low} + [\text{units } (R^I)]_{low}} \times 100,$$

so defining a first T/I ratio [(T/I)$_{low}$], with $$(T/I)_{low} = \frac{T_{low}}{I_{low}};$$

wherein recurring unit (R$^T$) is represented by formula (T):

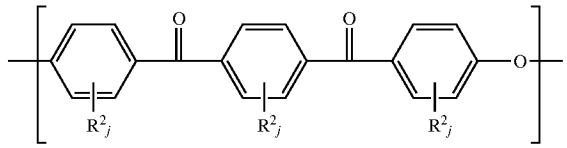

and recurring unit (R$^I$) is represented by formula (I):

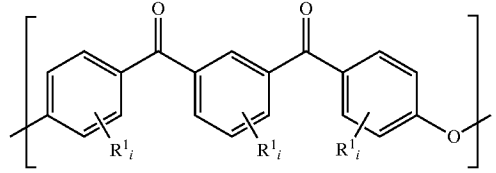

wherein:

each R$^1$ and R$^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, is an independently selected integers ranging from 0 to 4; and a minor amount of a second PEKK polymer [polymer (PEKK$_{high}$)] comprising said recurring units (R$^I$) and said recurring units (R$^T$), having a second molar content of units (R$^T$) [(T$_{high}$)] and a second molar content of units (R$^I$) [(I$_{high}$)], with $$T_{high}(\text{mol. \%}) = \frac{[\text{units }(R^T)]_{high}}{[\text{units }(R^T)]_{high} + [\text{units }(R^I)]_{high}} \times 100$$

and with $$I_{high}(\text{mol. \%}) = \frac{[\text{units }(R^I)]_{high}}{[\text{units }(R^T)]_{high} + [\text{units }(R^I)]_{high}} \times 100,$$

so defining a second T/I ratio [(T/I)$_{high}$], with $$(T/I)_{high} = \frac{T_{high}}{I_{high}};$$

wherein polymer (PEKK$_{low}$) is a nucleophilic PEKK; and
wherein the (T/I)$_{low}$ of PEKK$_{low}$ is lower than the (T/I)$_{high}$ of PEKK$_{high}$; and
wherein the following inequality is satisfied:

$T_{high} - T_{low} \leq 17$ mol. %.

2. The composition (C) according to claim 1, wherein said composition possesses:
a melting temperature ($T_m$) of less than or equal to 330° C.;
a heat of fusion ($\Delta H_f$) exceeding 25 J/g;
no crystallization peak upon heating, on second DSC heat scan "cold crystallization peak"; and
a relation between melting temperature $T_m$ in ° C. determined on second DSC heat scan and crystallization temperature ($T_c$ in ° C.) determined on first DSC cooling scan, satisfying the following inequality:

$T_c \geq 1.3716 \times T_m - 190°$ C., wherein $T_m$, $T_c$, $\Delta H_f$ and the absence of cold crystallization peak are measured by differential scanning calorimetry (DSC) according to ASTM D3418-03, E1356-03, E793-06, E794-06 standard, applying the following conditions:
first DSC heat scan: 30.00° C. to 400.00° C. at 20.00° C./min, isothermal at 400.00° C. for 1 min;
first DSC cooling scan: 400.00° C. to 30.00° C. at 20.00° C./min, isothermal for 1 min;
second DSC heat scan: 30.00° C. to 400.00° C. at 20.00° C./min, isothermal at 400.00° C. for 1 min.

3. The composition (C) according to claim 1, wherein the recurring units (R$^T$) and (R$^I$) are respectively represented by formulas (T') and (I'):

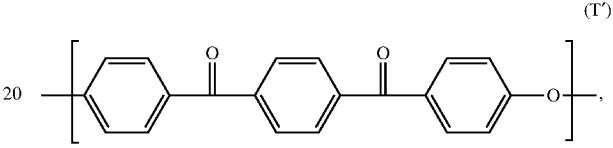

(T')

and

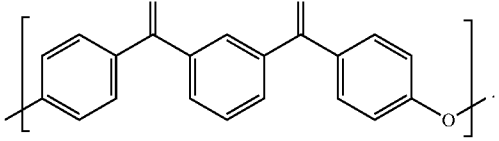

(I')

4. The composition (C) according to claim 1, wherein the polymer (PEKK$_{low}$) and the polymer (PEKK$_{high}$) are collectively referred as the polymers (PEKK), and wherein:
said polymers (PEKK) comprise recurring units (R$^T$) and recurring units (R$^I$), in a combined amount of at least 60 mol. % of the recurring units in the polymers (PEKK) are recurring units (R$^T$) and (R$^I$), the mol. % being based on the total number of moles in the polymers (PEKK); and/or
polymers (PEKK) may comprise minor amounts of recurring units different from recurring units (R$^T$) and recurring units (R$^I$), which are selected from the group consisting of formulae (J-A) to (J-O), herein below:

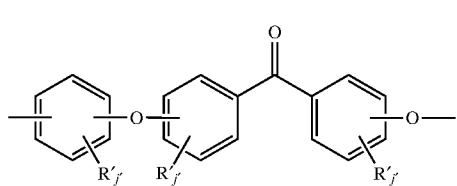

(J-A)

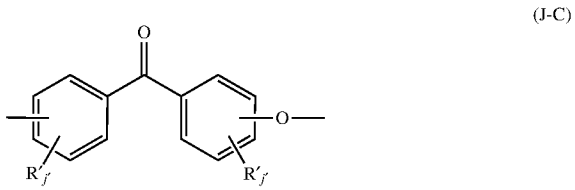

(J-C)

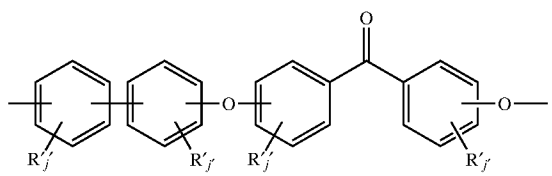

(J-D)

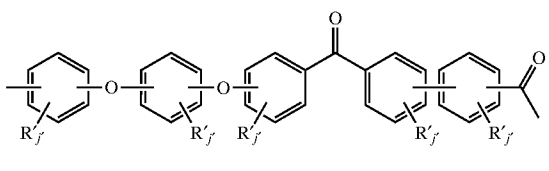

(J-E)

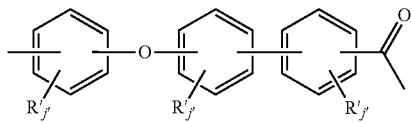
(J-F)
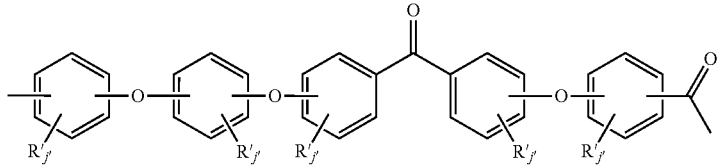
(J-G)
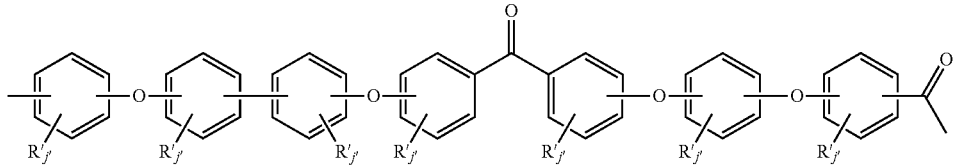
(J-H)
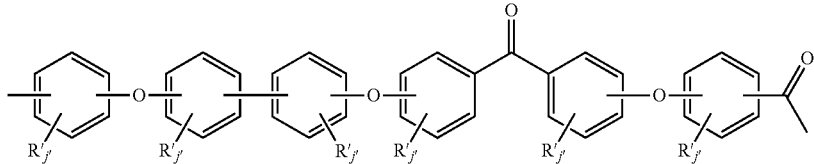
(J-I)
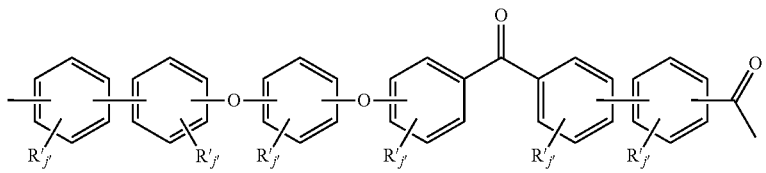
(J-J)
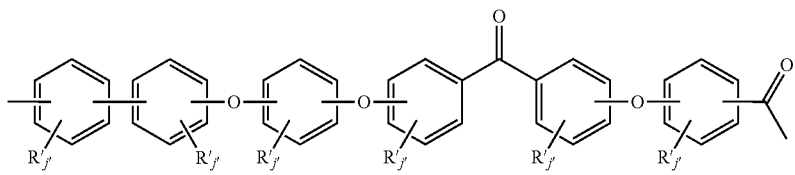
(J-K)
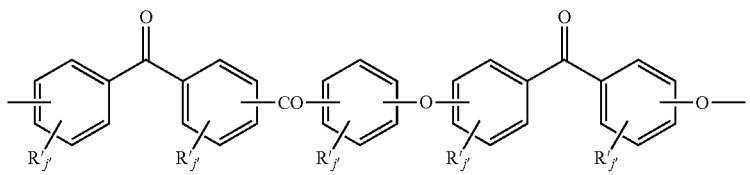
(J-L)
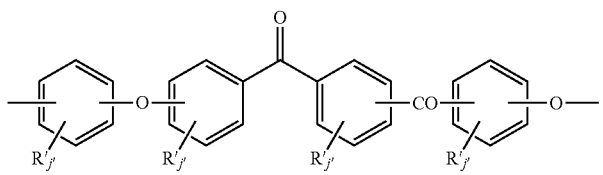
(J-M)
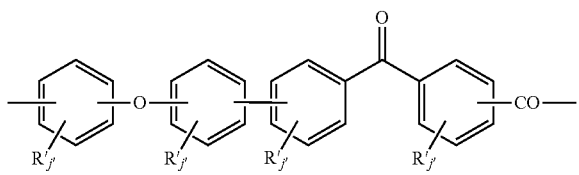
(J-N)

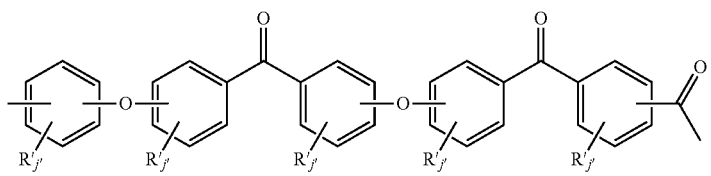

(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

5. The composition (C) according to claim 1, wherein:
the polymer ($PEKK_{low}$) comprises fluorine, in amounts of exceeding 100 ppm, and/or comprising Al in an amount of below 50 ppm, whereas Al and F content are determined by elemental analysis, such as ICP-OES analysis for Al and Combustion-ion chromatography for fluorine; and/or
the polymer ($PEKK_{low}$) has a thermal decomposition temperature at 1 wt. % $T_d(1\%)$ of at least 500° C., as measured by thermal gravimetric analysis according to ASTM D3850, heating from 30° C. to 800° C. under nitrogen using a heating rate of 10° C./min.

6. The composition (C) according to claim 1, wherein:
the polymer ($PEKK_{low}$) has a $(T/I)_{low}$ of at least 50/50, and/or a $(T/I)_{low}$ of at most 64/36; and/or
the polymer ($PEKK_{high}$) has a $(T/I)_{high}$ of at least 65/35; and/or a $(T/I)_{high}$ of at most 75/25; and/or
polymer ($PEKK_{low}$) and polymer ($PEKK_{high}$) are such that 16 mol % ≥ $T_{high}$ − $T_{low}$ ≥ 3 mol %.

7. The composition (C) according to claim 1, wherein the polymer ($PEKK_{high}$) is a nucleophilic PEKK, and possesses a fluorine content of exceeding 100 ppm, and/or an Al content of below 50 ppm, whereas Al and F content are determined by elemental analysis, such as ICP-OES analysis for Al and Combustion-ion chromatography for fluorine.

8. The composition (C) according to claim 1, wherein the weight ratio between polymer ($PEKK_{low}$) and polymer ($PEKK_{high}$) is of at least 60/40, and/or it is of at most 99/1.

9. The composition (C) according to claim 1, wherein:
the composition further comprises of at least one nitride (NI) of an element having an electronegativity (ε) of from 1.3 to 2.5; and/or
the composition further comprises one or more than one additional ingredients different from nitride (NI), and selected from the group consisting of colorants, pigments, light stabilizers, heat stabilizers, antioxidants, acid scavengers, processing aids, nucleating agents, internal lubricants and/or external lubricants, flame retardants, smoke-suppressing agents, anti-static agents, anti-blocking agents, heat, electric and magnetic conductive materials, reinforcing fibrous additives and reinforcing non-fibrous additives.

10. The composition according to claim 1, wherein the total weight of polymer ($PEKK_{low}$) and polymer ($PEKK_{high}$), based on the total weight of the inventive composition (C), is equal to or above 60 wt. %; and/or
wherein composition (C) does not comprise any other polyaryletherketone polymer [polymer (PAEK)] beside polymer ($PEKK_{low}$) and polymer ($PEKK_{high}$), whereas polymer (PAEK) is a polymer comprising recurring units, more than 50% moles of said recurring units are recurring units ($R^*_{PAEK}$) comprising a Ar*—C(O)—Ar*' group, with Ar* and Ar*', equal to or different from each other, being aromatic groups, which is not polymer ($PEKK_{low}$) or polymer ($PEKK_{high}$); and/or
wherein composition (C) essentially consists of polymer ($PEKK_{low}$) and polymer ($PEKK_{high}$); or
wherein, when used, the total weight of a nitride (NI) in the composition (C) is of at least about 0.1 wt. %, and/or of at most about 10 wt. %, based on the total weight of the composition (C).

11. A method of making the composition (C) according to claim 1, wherein said method comprises admixing polymer ($PEKK_{low}$), polymer ($PEKK_{high}$), optionally with other constituents; wherein said admixing may be achieved by dry or powder blending, suspension or slurry mixing, solution mixing, melt mixing or any combination thereof.

12. A shaped article comprising the composition (C) according to claim 1.

13. A method of making the shaped article of claim 12, said method comprising processing composition (C) by at least one of injection molding, extrusion, compression molding, additive manufacturing, coating, continuous fiber impregnation, and continuous fiber composite lamination/consolidation or combinations thereof.

14. A method of making a composite, said method comprising impregnating reinforcing fibers with a matrix of composition (C) according to claim 1.

15. A method of making an assembly comprising a first substrate layer and a second substrate layer, said method comprising positioning a tie-layer made from the composition (C) according to claim 1 between and in contact with the said first substrate and the said second substrate.

* * * * *